US008792718B2

(12) United States Patent
Bai et al.

(10) Patent No.: US 8,792,718 B2
(45) Date of Patent: Jul. 29, 2014

(54) TEMPORAL MATTE FILTER FOR VIDEO MATTING

(75) Inventors: Xue Bai, Minneappolis, MN (US); Jue Wang, Kenmore, WA (US); David P. Simons, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 61 days.

(21) Appl. No.: 13/538,712

(22) Filed: Jun. 29, 2012

(65) Prior Publication Data

US 2014/0002746 A1 Jan. 2, 2014

(51) Int. Cl.
*G06K 9/34* (2006.01)
*G06K 9/48* (2006.01)
*G06K 9/40* (2006.01)

(52) U.S. Cl.
USPC ............................ 382/173; 382/199; 382/266

(58) Field of Classification Search
None
See application file for complete search history.

(56) References Cited

U.S. PATENT DOCUMENTS

| | | |
|---|---|---|
| 2007/0165966 A1 | 7/2007 | Weiss et al. |
| 2009/0129700 A1 | 5/2009 | Rother et al. |
| 2010/0046830 A1 | 2/2010 | Wang et al. |
| 2011/0038536 A1 | 2/2011 | Gong |
| 2011/0293247 A1* | 12/2011 | Bhagavathy et al. ......... 386/278 |
| 2014/0003719 A1 | 1/2014 | Bai et al. |

OTHER PUBLICATIONS

Bai et al, "Video snapcut: robust video object cutout using localized classifiers," 2009, ACM Transactions on Graphics (TOG), vol. 28, No. 3, pp. 1-11.*
Villegas, P., Marichal, X.: Perceptually-weighted evaluation criteria for segmentation masks in video sequences. IEEE Trans. Image Processing 13 (2004) pp. 1092-1103.
Levin, A., Lischinski, D., Weiss, Y.: A closed-form solution to natural image matting. IEEE Trans. on Pattern Analysis and Machine Intelligence 30 (2008) pp. 228-242.
Gastal, E.S.L., Oliveira, M.M.: Shared sampling for real-time alpha matting. Computer Graphics Forum 29 (2010) 575-584 Proceedings of Eurographics. pp. 1-10.
Zheng, Y., Kambhamettu, C.: Learning based digital matting. In: Proc. IEEE International Conference on Computer Vision. (2009) pp. 1-19.

(Continued)

*Primary Examiner* — Bhavesh Mehta
*Assistant Examiner* — David F Dunphy
(74) *Attorney, Agent, or Firm* — Wolfe-SBMC

(57) ABSTRACT

Methods and apparatus for temporal matte filtering. Temporal matte filtering methods are described that improve the temporal coherence of alpha mattes for a video sequence while maintaining the matte structures on individual frames. The temporal matte filter may implement a level-set-based matte averaging method. In the level-set-based matte averaging method, two or more input alpha mattes are obtained. Level set curves are generated for the two or more alpha mattes. An averaged level set is computed from the two or more level sets according to a distance-transform-based technique. A temporally smoothed alpha matte may then be reconstructed by interpolating pixel alpha values between the inner and outer level set curves of the averaged level set. The alpha mattes can be optionally warped towards a center frame according to an optical flow technique before the averaging operation performed by the temporal matte filter.

20 Claims, 26 Drawing Sheets

(56) References Cited

OTHER PUBLICATIONS

Wang, J., Cohen, M.: Image and video matting: A survey. Foundations and Trends in Computer Graphics and Vision 3 (2007) pp. 97-175.

Chuang, Y.Y., Agarwala, A., Curless, B., Salesin, D., Szeliski, R.: Video matting of complex scenes. In: Proceedings of ACM SIGGRAPH. (2002) pp. 243-248.

Chuang, Y.Y., Curless, B., Salesin, D.H., Szeliski, R.: A bayesian approach to digital matting. In: Proc. of IEEE CVPR. (2001) pp. 264-271.

Y. Li, J.S., Shum, H.: Video object cut and paste. In: Proc. ACM SIGGRAPH. (2005) pp. 595-600.

Wang, J., Bhat, P., Colburn, R.A., Agrawala, M., Cohen, M.F.: Interactive video cutout. ACM Trans. Graph. 24 (2005) pp. 585-594.

Bai, X., Wang, J., Simons, D., Sapiro, G.: Video snapcut: robust video object cutout using localized classifiers. ACM Trans. Graph. 28 (2009) pp. 70:1-70:11.

Lee, S.Y., Yoon, J.C., Lee, I.K: Temporally coherent video matting. Graphical Models 72 (2010) pp. 25-33.

Wang, J., Cohen, M.: Optimized color sampling for robust matting. In: Proc. IEEE CVPR. (2007) pp. 1-8.

"Non-Final Office Action", U.S. Appl. No. 13/538,718, Aug. 29, 2013, 16 pages.

"Final Office Action", U.S. Appl. No. 13/538,718, Jan. 21, 2014, 16 pages.

"Advisory Action", U.S. Appl. No. 13/538,718, Mar. 6, 2014, 3 pages.

\* cited by examiner

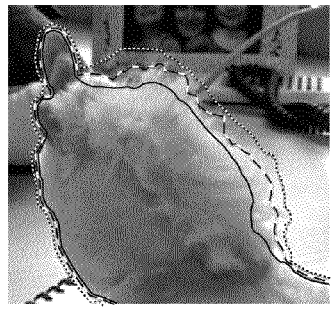 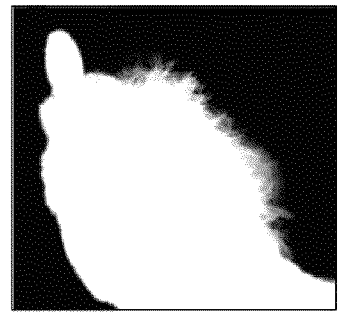
FIG. 2A  FIG. 2B
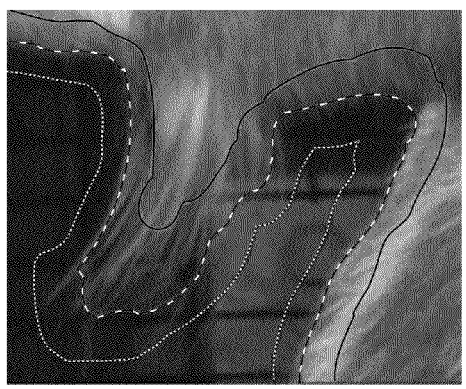 
FIG. 3A  FIG. 3B
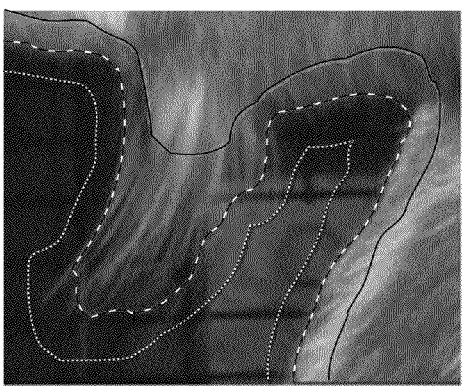 
FIG. 3C  FIG. 3D

TEMPORAL MATTE FILTER FOR VIDEO MATTING

BACKGROUND

Description of the Related Art

Video matting is the process of extracting the alpha mattes in videos. Video matting often involves separating a hairy or fuzzy foreground object from the background (either static or dynamic) by determining partial pixel coverage around the object boundary (the unknown region) on each video frame. Mathematically, a boundary pixel $I_p^t$ on frame t is modeled as a convex combination of a foreground color $F_p^t$ and a background color $B_p^t$:

$$I_p^t = \alpha_p^t F_p^t + (1-\alpha_p^t) B_p^t,$$

where $$\alpha_p^t \in [0,1]$$

is the alpha matte that matting systems seek to solve for. Once estimated, the alpha matte can be used, for example, to create new composites, or as a layer mask for applying object-specific effects in the video. Video matting is thus a key component in the video post-production pipeline.

Extracting temporally-coherent alpha mattes in video is an important but challenging problem in post-production. Conventional video matting systems are highly sensitive to initial conditions and image noise, and thus cannot reliably produce stable alpha mattes without temporal jitter. The requirement for accurate video matting is two-fold. First, it requires spatial accuracy, which means that the alpha mattes extracted on individual frames should accurately represent the object to be extracted. Second, it demands temporal coherence, meaning that playing the extracted mattes in normal video speed should not result in noticeable temporal jitter. In fact, temporal coherence is often more important as the human visualization system (HVS) is more sensitive to temporal inconsistency when watching a video.

Due to the importance of temporal coherence, directly applying image matting approaches frame-by-frame for video is undesirable. Conventional video matting approaches combine image matting methods with special temporal coherence treatments to try to meet both goals. However, these conventional approaches may not reliably generate high quality, temporally-coherent alpha mattes even in relatively simple cases. Conventional matting algorithms typically require an input trimap to start with, and these algorithms tend to be very sensitive to how the trimap is defined on each frame. Changing the trimap even slightly may result in a large change in the final matte. In addition, conventional matting approaches generally try to impose some temporal coherence constraints when solving for the alpha matte on each frame. However, due to image noise and other factors, the mattes generated in this way generally contain temporal jitter.

SUMMARY

Various embodiments of methods and apparatus for video matting are described. In particular, embodiments of a temporal matte filter are described that improve the temporal coherence of alpha mattes for a sequence of images, for example a video sequence, while maintaining the matte structures on individual frames.

Due to various contributing factors such as scene color changes and image noise, alpha mattes generated on individual frames may contain a certain degree of temporal jitter. Embodiments of a temporal matte filter are described that may reduce the jitter and improve the temporal coherence of the final alpha mattes in alpha matte sequences. Embodiments of the temporal matte filter may, for example, be used in a video matting system to reduce jitter and improve temporal coherence in alpha matte sequences. The alpha matte sequences may be, but are not necessarily, generated according to an adaptive trimap propagation method.

Embodiments of the temporal matte filter may implement a level-set-based matte averaging method. In the level-set-based matte averaging method, two or more input alpha mattes are obtained. Level set curves (also referred to as contour lines) are generated for the two or more alpha mattes. An averaged level set is computed from the two or more level sets according to a distance-transform-based technique. A temporally smoothed alpha matte may then be reconstructed by interpolating pixel alpha values from two nearest level set curves in the averaged level set for each pixel between the inner and outer level set curves of the averaged level set. Each pixel outside the inner and outer level set curves may be assigned either a background value or a foreground value, depending on which side (background or foreground) of the averaged level set the pixel is on.

In at least some embodiments, for higher quality results, the alpha mattes can be optionally warped towards a center frame according to an optical flow technique before the averaging operation performed by the temporal matte filter. The temporal matte filter may then be applied iteratively over a chunk of frames to achieve a stronger temporal smoothing effect.

BRIEF DESCRIPTION OF THE DRAWINGS

FIGS. 2A and 2B illustrate an adaptive trimap or matting band used to generate an alpha matte, according to at least some embodiments.

FIGS. 3A through 3D illustrate how variations in bandwidth of the trimap can affect alpha mattes, according to at least some embodiments.

Figure 1A:
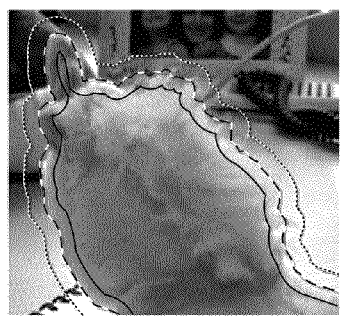
FIGS. 1A through 1D illustrate how the accuracy of the input trimap affects the final matte.
Figure 1B:
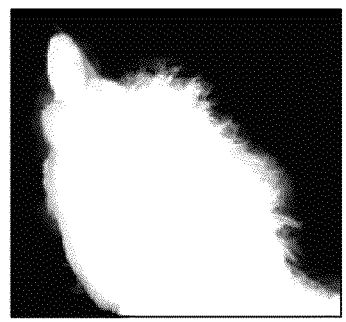

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for video matting are described. Embodiments of a temporally-coherent, adaptive trimap propagation method are described which allows a trimap to be propagated from one frame to the next in a coherent way. This provides improved matte stability, as the initial matting conditions on adjacent frames are consistent. Embodiments of the adaptive trimap propagation method allow an accurate and consistent trimap to be generated on each frame, which sets up a temporally-coherent initial condition for a matte solver (e.g., alpha matte generation 1906 module or component in FIG. 26). In addition, embodiments of a temporal matte filter are described that improve the temporal coherence of the final alpha mattes while maintaining the matte structures on individual frames. Embodiments of the adaptive trimap propagation method and of the temporal matte filter may be combined with other matting techniques to form an efficient video matting system. Embodiments of a video matting system that implement embodiments of the adaptive trimap propagation method and the temporal matte filter are described that may generate high quality alpha mattes with better temporal coherence than those generated by conventional video matting approaches.

A trimap may be defined as a pre-segmentation of an image that divides the image into a foreground region (e.g., an object to be extracted), a background region (e.g., a region to be removed or masked), and an unknown region (e.g., a band around the foreground region that may include "fuzzy" content, for example hair, that may be a combination of foreground and background). See FIGS. 1A and 1C for examples of conventional uniform bandwidth trimaps. An adaptive trimap may be defined as a trimap with varying bandwidth. See FIG. 2A for an example of an adaptive trimap.

Figure 1C:
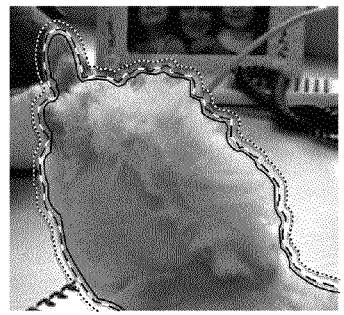
Figure 1D:
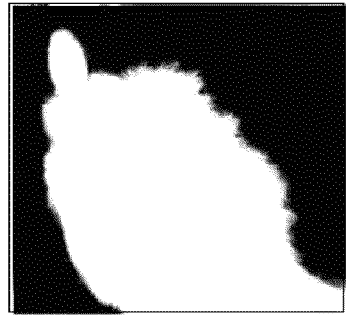

Since the trimap is treated as a hard constraint for matting, matting algorithms are very sensitive to even small changes to the trimap. FIGS. 1A through 1D illustrate how the accuracy of the input trimap affects the final matte. FIGS. 1A and 1C illustrate a uniform bandwidth matting band generated by eroding (solid line) and dilating (dotted line) the binary segmentation boundary (dashed line). Given a binary mask $B^t$, conventional video matting approaches typically create a uniform bandwidth unknown region by eroding and dilating $B^t$ for a fixed number of pixels, as shown in FIGS. 1A and 1C. The unknown region of the trimap may be referred to as the matting band. However, this uniform matting band is not accurate enough for objects with various lengths of hair or similar "fuzzy" features around the boundary. If the bandwidth is too large as shown in FIG. 1A, or too small as shown in FIG. 1C, the results of using a matting Laplacian or similar method will generally contain various artifacts, as shown in the respective alpha mattes in FIGS. 1B and 1D.

FIGS. 2A and 2B illustrate an adaptive trimap or matting band used to generate an alpha matte, according to at least some embodiments. As can be seen in FIG. 2B, a more accurate alpha matte than those shown in FIGS. 1B and 1D can be achieved by using an adaptive matting band shown in FIG. 2A, which is wider where the hair is longer, and narrower where the boundary is nearly solid.

However, using an adaptive trimap as shown in FIG. 2A alone may not be sufficient to guarantee the temporal coherence of the alpha mattes. For the same part of the object, if the local bandwidth is not consistent across frames, then the local mattes may have temporal jitter. An example is shown in FIG. 3A through 3D. For the same part of the object, if the inner boundary (solid line) of the matting band is changed a small amount, as shown in FIGS. 3A and 3C, this small change may lead to a significant change in the final alpha matte, as shown in the respective alpha mattes in FIGS. 3B and 3D. This suggests that in order to achieve temporally coherent alpha matting, in addition to accurate adaptive trimap generation, the local bandwidth of the matting band needs to be temporally consistent.

Video Matting System Framework

Figure 4:
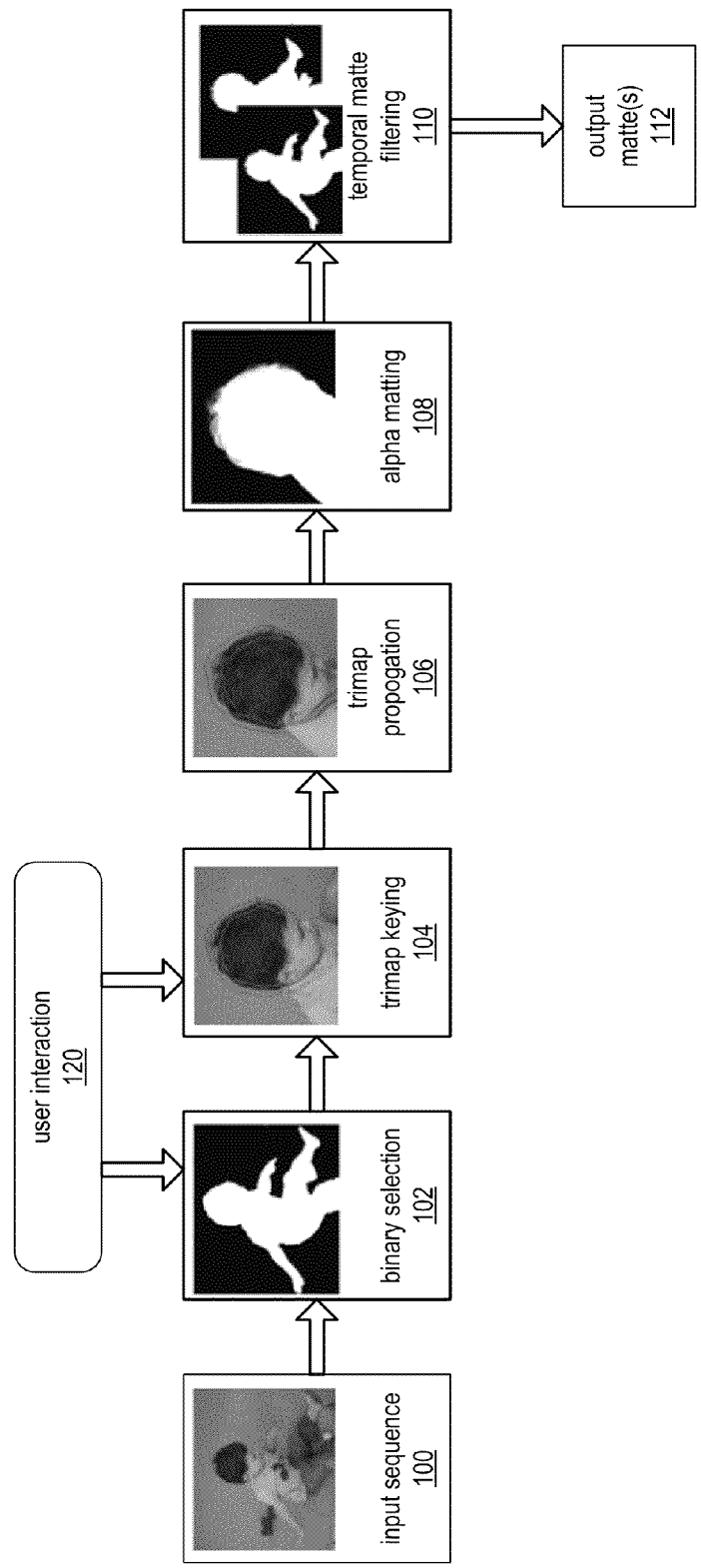
FIG. 4 is an example workflow for an example embodiment of a video matting system that incorporates both an embodiment of the adaptive trimap propagation method and an embodiment of the temporal matte filter.

FIG. 4 is an example workflow for an example embodiment of a video matting system that incorporates both an embodiment of the adaptive trimap propagation method and an embodiment of the temporal matte filter. At 102, given an input sequence 100, a binary mask may be generated for the target object on each frame. One or more of various interactive and/or automatic image processing techniques may be used to generate the binary masks. At 104, trimaps may then be generated for some keyframes, for example for a first frame in a video sequence, or for the first frame in each of two or more video segments. In at least some embodiments, a user may use brush tools and/or other interactive techniques to specify trimaps on the keyframes. At 106, the trimaps are then parameterized and propagated from the keyframe(s) to the other frames, using an embodiment of an adaptive trimap propagation method as described herein. At 108, alpha mattes are then computed for the frames according to the propagated adaptive trimaps. Any of several techniques for generating alpha mattes from trimaps may be used in various embodiments. In at least some embodiments, if the alpha mattes on some frames contain errors, the user can additionally modify the trimaps on those frames, and the system may automatically propagate the user edits to neighboring frames to improve the mattes. Once the initial alpha mattes are computed, an embodiment of the temporal matte filter may be applied to the alpha mattes to improve their temporal coherence, as indicated at 110. Output of the video matting system are the temporally-consistent alpha mattes 112.

Figure 5:
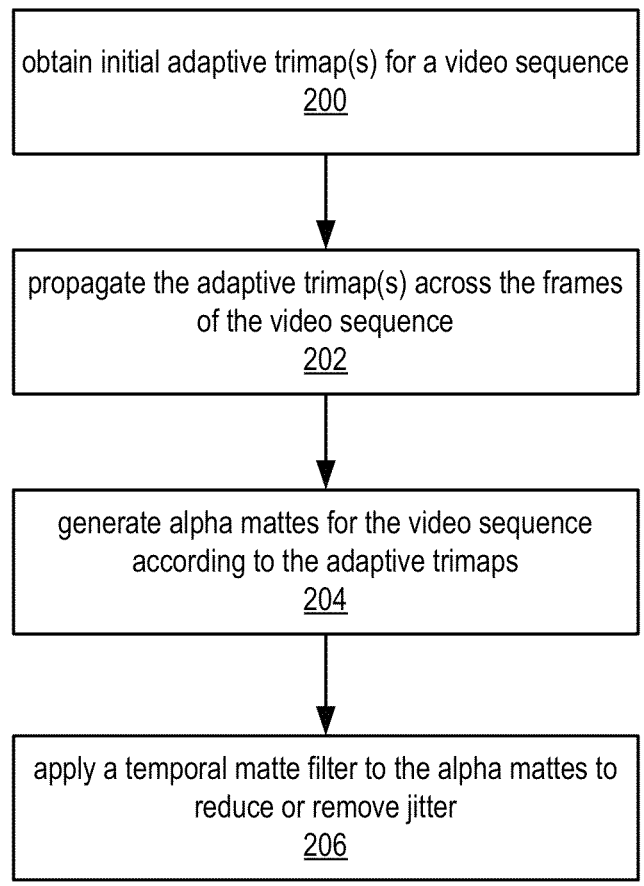
FIG. 5 is a high-level flowchart of a video matting system according to at least some embodiments.

FIG. 5 is a high-level flowchart of a video matting system according to at least some embodiments. As indicated at 200, initial adaptive trimap(s) may be obtained for a video sequence. As indicated at 202, the adaptive trimap(s) may be propagated across the frames of the video sequence according to an embodiment of the adaptive trimap propagation method. As indicated at 204, alpha mattes may then be generated for the video sequence according to the adaptive trimaps. Note that, in at least some embodiments, instead of generating all the adaptive trimaps and then generating the alpha mattes, the workflow may propagate a trimap from a previous frame to a frame and then generate an alpha matte for the frame prior to moving to the next frame (see FIG. 6). As indicated at 206, an embodiment of the temporal matte filter may then be applied to the alpha mattes to improve the temporal coherence of the alpha mattes and thus reduce or remove jitter in the alpha mattes.

Embodiments of the video matting system may be applied to either color or grayscale ("black and white") video sequences to generate alpha mattes for frames in the sequences. Note that the example video frames shown in the Figures are all originally color images, but have been converted to grayscale for this document.

Figure 25A:
FIGS. 25A through 25G illustrate results of an embodiment of a video matting system, for example as illustrated in FIGS. 4 and 5, and compare the results to those of conventional techniques.
Figure 25B:
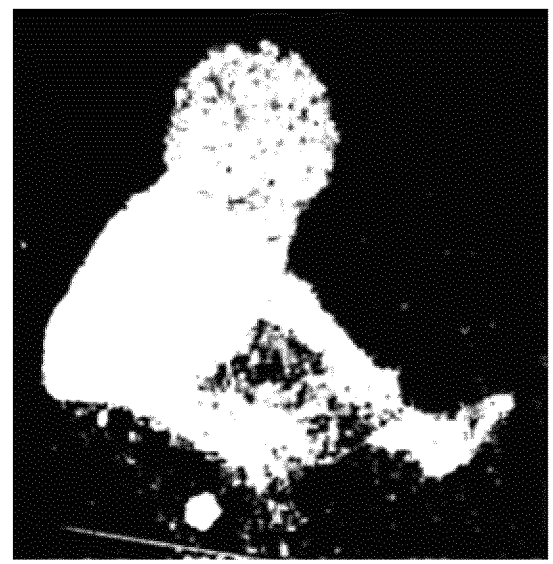
Figure 25C:
Figure 25D:
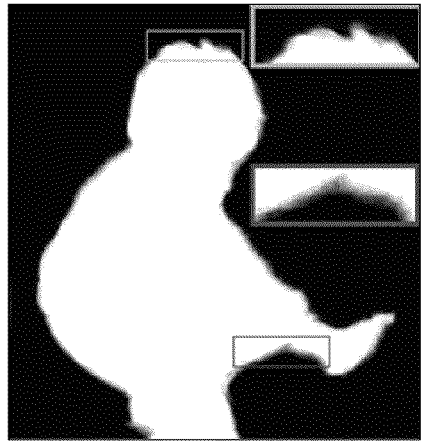
Figure 25E:
Figure 25F:
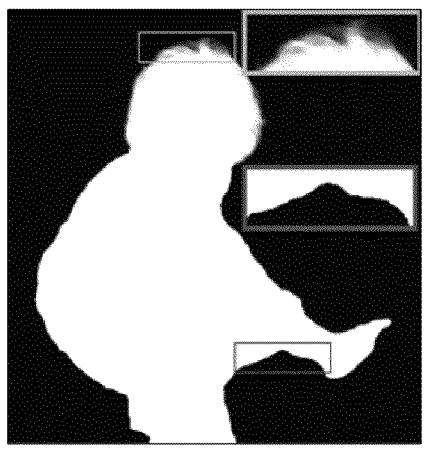
Figure 25G:
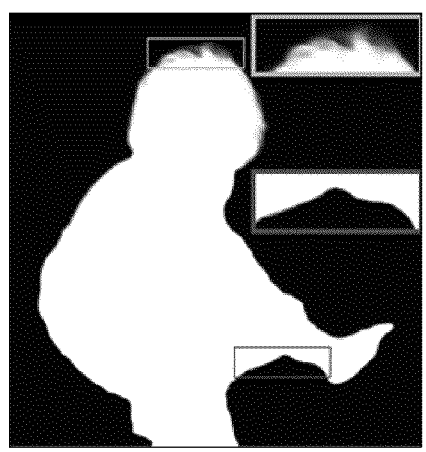

FIGS. 25A through 25G illustrate results of an embodiment of a video matting system, for example as illustrated in FIGS. 4 and 5, and compare the results to those of conventional techniques. FIG. 25A shows an example video frame used for comparison. FIG. 25B shows an alpha matte generated according to a conventional blue/green screen chroma keying method. FIG. 25C shows a uniform bandwidth trimap generated according to a conventional technique. FIG. 25D shows an alpha matte generated from the uniform trimap of FIG. 25C. FIG. 25E shows a variable bandwidth trimap generated according to an embodiment of the adaptive trimap propagation technique described herein. FIG. 25F shows an alpha matte generated from the trimap of FIG. 25E. FIG. 25G shows an improved alpha matte generated from the alpha matte of FIG. 25F after being temporally smoothed according to an embodiment of the temporal matte filtering method described herein.

Since the example in FIG. 25A contains moving and textured background, conventional blue/green screen chroma keying methods do not work well, as shown by the matte in FIG. 25B. FIGS. 25B and 25C illustrate a conventional uniform trimap approach and its resulting alpha matte. As shown in FIG. 25C, the uniform trimap is too narrow for the hair region, and thus the matte in the hair region is less soft than desired. The uniform trimap is also too wide for the lower body, which introduces significant noise in the alpha matte. Using an embodiment of the adaptive trimap method as described herein, substantially better alpha mattes can be generated as shown in FIG. 25E (the adaptive trimap) and 25F (the resulting alpha matte). The alpha matte of FIG. 25F may be further improved by applying an embodiment of the temporal matte filtering method as described herein, as shown in FIG. 25G.

The following sections describe embodiments of the adaptive trimap propagation method and embodiments of the temporal matte filter method that may be used in a video matting system as illustrated in FIGS. 4 and 5. Note that while these methods are described above as being implemented together in a video matting system as shown in FIG. 4 or 5, each of these methods may be separately implemented. In other words, an embodiment of the adaptive trimap propagation method may be used to generate adaptive trimaps in applications or systems where an embodiment of the temporal matte filter is not implemented, and vice versa.

Adaptive Trimap Propagation

Different methods for performing adaptive trimap propagation are described. A first method propagates automatically computed local trimap radii for a frame to the next frame. This method may be referred to as a radius-based adaptive trimap propagation method. A second method employs pins on the binary segmentation boundary and a mesh generated for the unknown region; the pins are tracked from one frame to the next frame according to an optical flow technique, the mesh is deformed from one frame to the next according to the movement of the pins, and the adaptive trimap is then warped according to the deformed mesh. This method may be referred to as a warp-based adaptive trimap propagation method. These two methods can be used separately, or can be combined to produce a third adaptive trimap propagation method, for example where the first method is used to propagate relatively narrow regions of the adaptive trimap, and the second method is used to propagate relatively wide regions of the adaptive trimap.

In the following sections, a general workflow for adaptive trimap propagation is first described, and then each of the above adaptive trimap propagation methods is described.

Adaptive Trimap Propagation General Workflow

Figure 6:
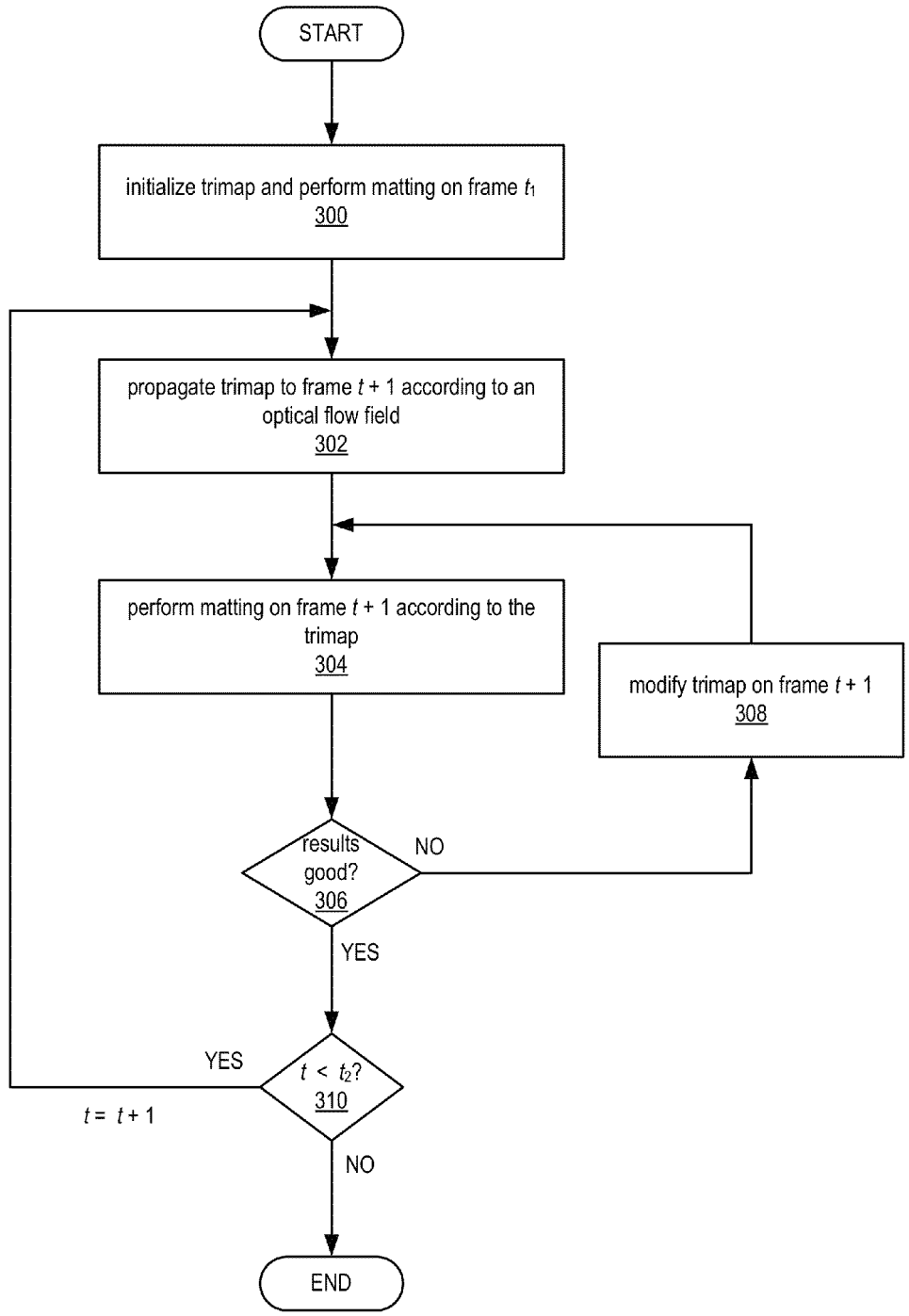
FIG. 6 illustrates an example general workflow for adaptive trimap propagation, according to at least some embodiments.
Figure 26:
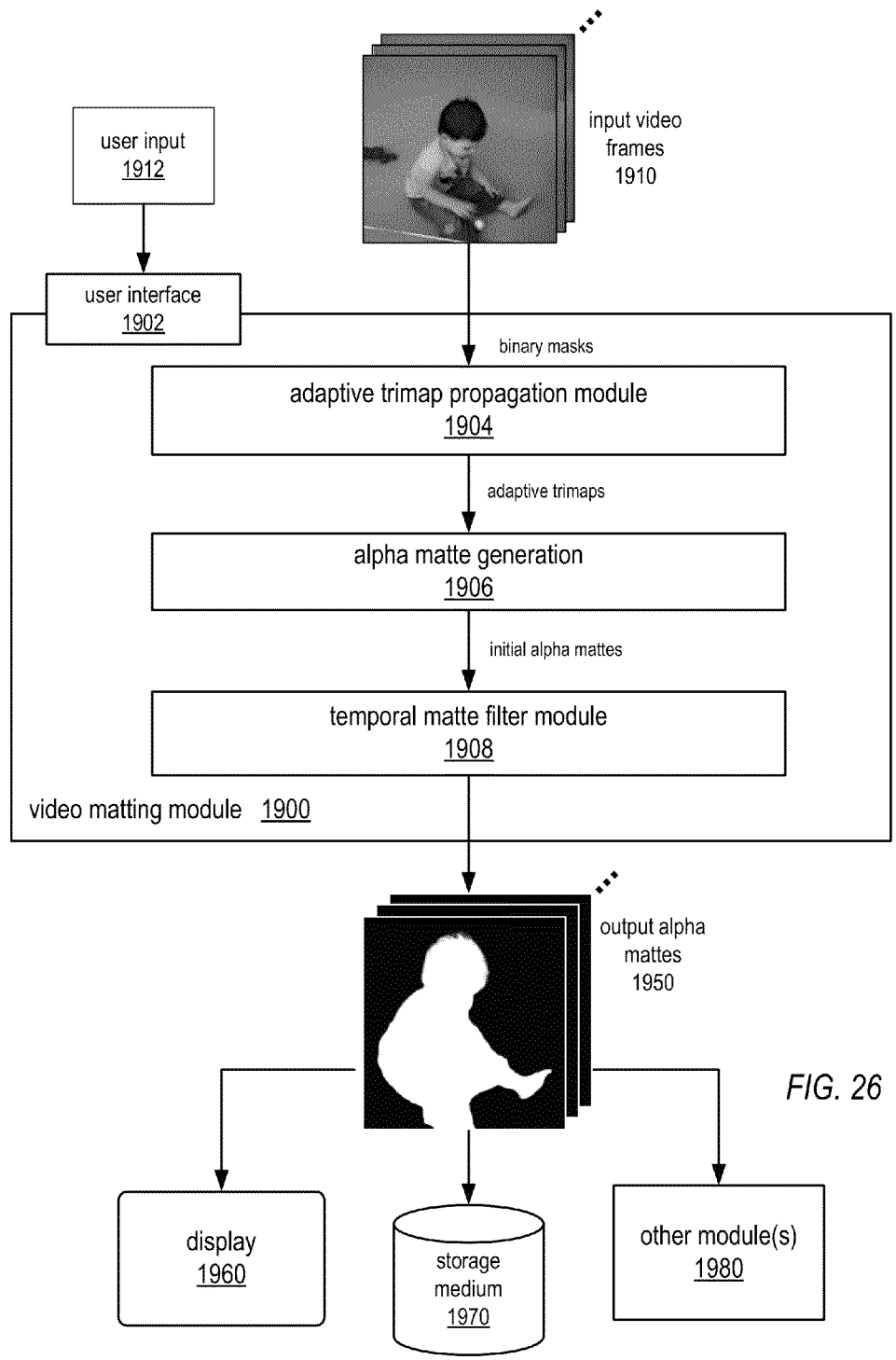
FIG. 26 illustrates example modules that may implement embodiments of the video matting methods described herein, according to at least some embodiments.

FIG. 6 illustrates an example general workflow for adaptive trimap propagation, according to at least some embodiments. The adaptive trimap propagation method, for example implemented as a module 1904 as illustrated in FIG. 26, may receive as input binary segmentations (e.g., binary masks) of the target object(s) on each video frame. One or more interactive and/or automatic image processing techniques may be used to generate the binary segmentations. In at least some embodiments, to extract the alpha mattes from frame $t_1$ to frame $t_2$, the user initializes the trimap on the starting frame ($t_1$), and the alpha matte is automatically computed for the frame, as indicated at 300. The trimap is propagated to the next frame (t+1) by an adaptive trimap propagation method according to an optical flow field between the two frames, as indicated at 302, and the alpha matte is automatically computed for that frame (t+1) as indicated at 304. In at least some embodiments, at 306, if the results are not satisfactory, the user can optionally correct the new trimap as indicated at 308, and alpha matting 304 can be re-performed according to the corrected trimap, until satisfactory results are achieved. As indicated at 310, the process may be repeated till the last frame ($t_2$) has been processed. The adaptive trimap propagation workflow outputs the alpha mattes from $t_1$ to $t_2$.

Radius-based Adaptive Trimap Propagation Method

Embodiments of a radius-based adaptive trimap propagation method are described that compute local trimap radii for a frame and propagate the radii to the next frame to thus achieve propagation of the adaptive trimap.

Figure 7:
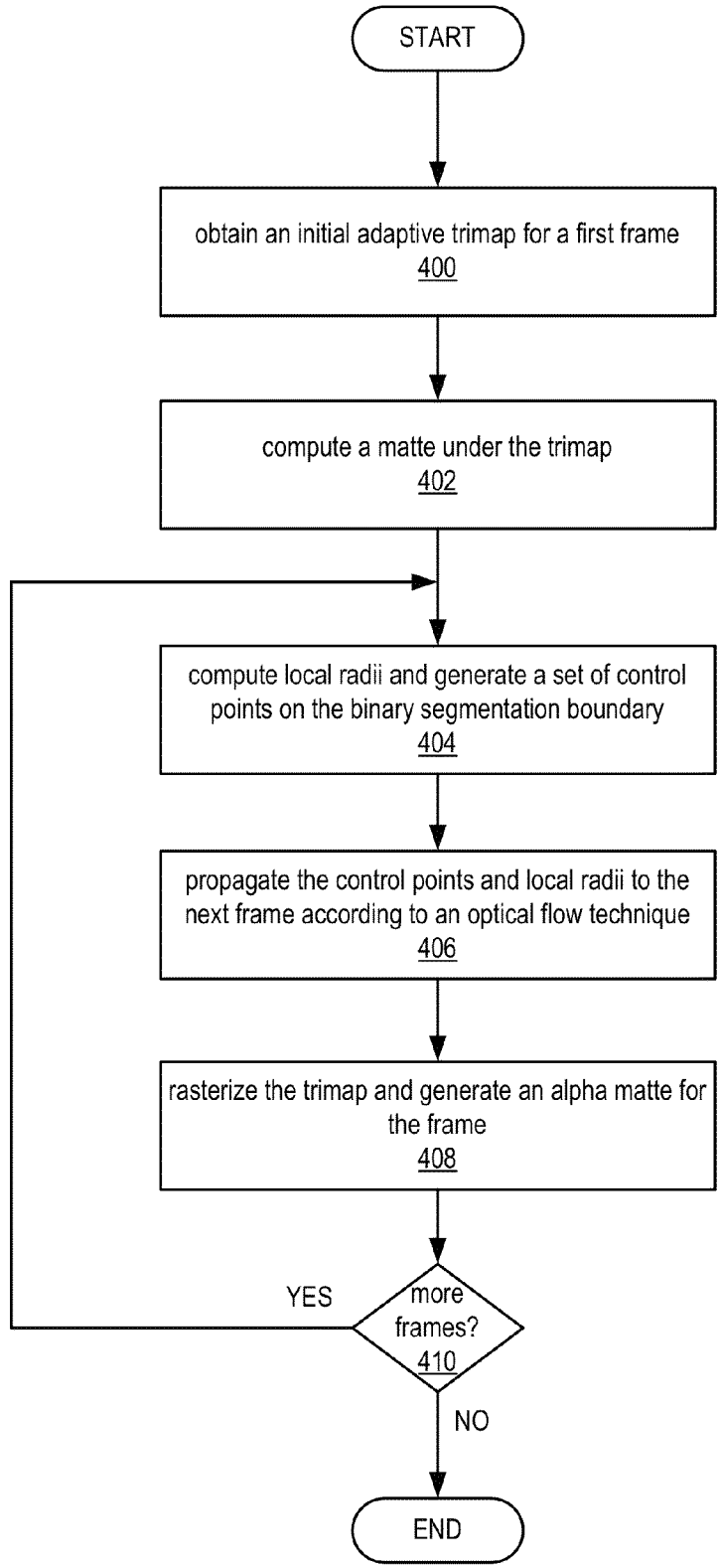
FIG. 7 is a high-level flowchart of a radius-based adaptive trimap propagation method, according to at least some embodiments.

FIG. 7 is a high-level flowchart of a radius-based adaptive trimap propagation method, according to at least some embodiments. As indicated at 400, an initial adaptive trimap for a first frame in a video sequence may be obtained. In at least some embodiments, the initial adaptive trimap may be user-specified. As indicated at 402, an alpha matte is computed under the trimap. In at least some embodiments, the alpha matte is computed for the entire frame. As indicated at 404, local radii are computed along the binary segmentation boundary, and a set of control points are generated along the binary segmentation boundary. As indicated at 406, the control points and local radii are propagated to the next frame according to an optical flow technique. As indicated at 408, the trimap is rasterized and an alpha matte is generated for the frame. Note that, in some embodiments, user input may be received to adjust the new trimap. At 410, if there are more frames, the method may return to 404 to propagate the trimap to the next frame. Otherwise, the method is done. The elements of FIG. 7 are discussed in more detail below in reference to FIGS. 8A through 8F.

FIGS. 8A through 8F graphically illustrate the radius-based adaptive trimap propagation method, according to at least some embodiments.

Figure 8A:
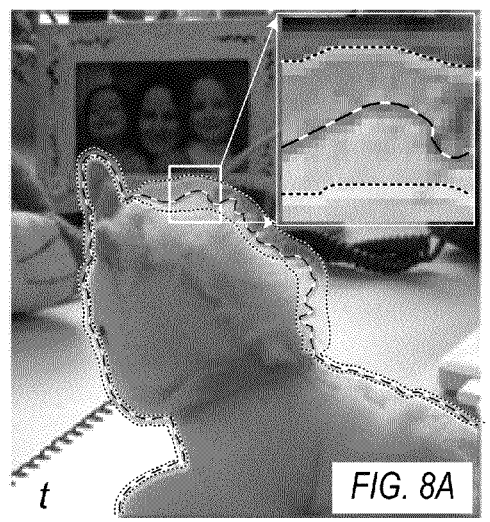
FIGS. 8A through 8F graphically illustrate the radius-based adaptive trimap propagation method, according to at least some embodiments.
Figure 8B:
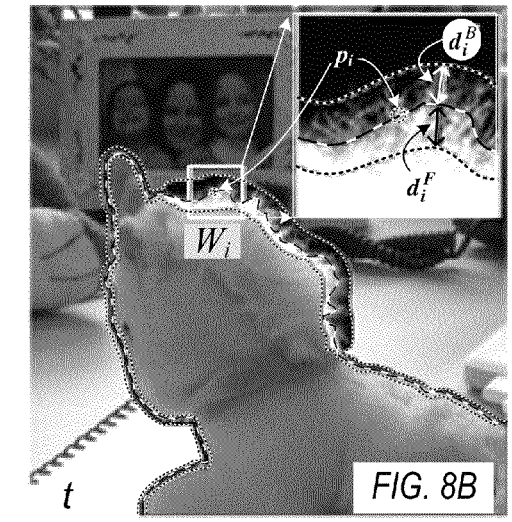

As indicated at 400 of FIG. 7, an initial adaptive trimap for a first frame (a keyframe) in a video sequence may be obtained. In at least some embodiments, given the binary segmentation boundary (dashed line in FIG. 8A), the user may specify a region of the object on a keyframe (e.g., the hair region in FIG. 8A), as shown as the region between the dotted lines in FIG. 8A. In at least some embodiments, or unspecified parts of the object, a relatively narrow trimap may be generated, for example by expanding the binary segmentation boundary. A matte may then be automatically computed under the current trimap, as shown in FIG. 8B. In at least some embodiments, the user may iteratively adjust the adaptive trimap until a satisfying matte is achieved on the keyframe.

Figure 8C:

In at least some embodiments, to parameterize the adaptive trimap, given any point $p_i$ on the binary contour, a local window $W_i$ may be defined, and a local inner and outer radius $d_i^F$ and $d_i^B$ may be computed which together can cover all fractional alpha pixels in the local window, as shown in FIG. 8B. By sampling along the object contour uniformly, a set of control points $$\{p_i, d_i^F, d_i^B\}, i=1, \ldots M,$$

may be generated and connected, as shown by the dotted circles along the binary segmentation boundary in FIG. 8C.

Figure 8D:
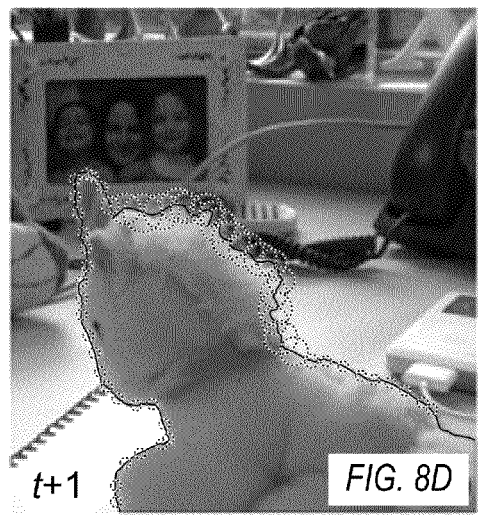
Figure 8E:
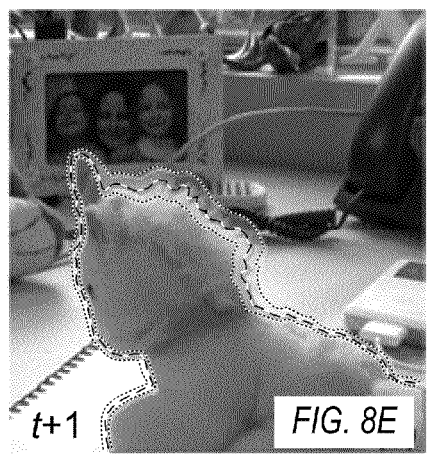
Figure 8F:
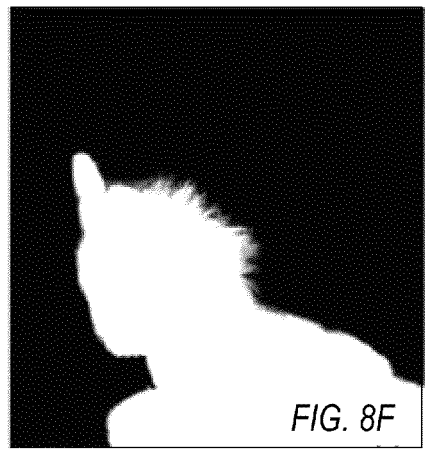

In at least some embodiments, to propagate the parameterized trimap shape shown in FIG. 8C to the next frame, an optical flow field may be computed between the current (frame t) and the next frame (frame t+1) and may be used to push the set of control points to new locations $$\{p_i', d_i^F, d_i^B\},$$

based on the object motion, as shown in FIG. 8D. Due to optical flow errors and topology changes, the moved control points $p_i'$ may not be on the binary segmentation boundary on frame t+1. In at least some embodiments, to assign the radius values to points on the object boundary (the binary segmentation boundary), a thin-plate interpolation method may be employed. Specifically, an interpolation function may be computed as:

$$f(x, y) = c_0 + c_x x + c_y y + \sum_{i=1}^{M} c_i \phi(\|(x, y) - p_i'\|), \quad (1)$$

where $\phi(r) = r^2 \log r$ is the thin plate spline function, and the coefficients $c_0, c_x, c_y, c_1, \ldots, c_M$ are solved by minimizing smoothing thin plate spline energy function. A new set of control points may then be uniformly sampled around the object boundary on frame t+1 as $\{q_j\}$, j=1, ..., M. The inner trimap radius at each new control point is $d^F(q_j)=f(q_j)$. The outer trimap radius $d^B(q_j)$ is computed in a similar fashion. Note that other methods may be used to assign the radius values to points on the object boundary in some embodiments. Once the local radii for all control points are computed (FIG. 8D), the trimap may be rasterized as shown in FIG. 8E, and an alpha matte may be computed on the new frame, as shown in FIG. 8F.

The above describes a method for propagating an adaptive trimap from frame t to t+1, according to at least some embodiments. In at least some embodiments, to further propagate the trimap, the radius values $d^F(q_j)$ and $d^B(q_j)$ may be updated based on the newly-computed alpha matte on frame t+1 (see, e.g., FIG. 8F). In at least some embodiments, all radius values may be updated based on the alpha matte, as was done on the keyframe. However, this solution may lead to deteriorated trimaps, since the computed alpha matte may contain errors, and these errors will in turn introduce more errors in the trimap. Thus, in at least some embodiments, the radius values may be updated conservatively, i.e., the local trimap radius may only be updated when there is a high confidence on the local alpha matte.

Applying a Gaussian Mixture Model (GMM) to Determine Local Confidence

An observation is that the matte quality is directly related to local foreground and background color distributions. If the colors are distinct, the matte is usually accurate. On the contrary, matte error may be introduced when the foreground and background color distributions overlap. Thus, in at least some embodiments, for every control point $q_j$ a local matte confidence $f_j$, may be computed based on the local color distributions. Specifically, inside the local window $W_j$ centered at $q_j$, a group of foreground and background colors may be sampled based on the computed alpha matte as $F_k$ and $B_k$, k=1, ..., S. A foreground Gaussian mixture Model (GMM) may then be estimated based on $F_k$s, and a background GMM may be estimated based on $B_k$s, denoted as $G^F$ and $G^B$, respectively. The matte confidence $f_j$ is computed as $$f_j = \frac{1}{S}\sum_{k=1}^{S}\left(1 - \frac{G^F(B_k) + G^B(F_k)}{2}\right), \quad (2)$$

where $G^F(x)$ is the probability measured by the GMM model $G^F$ given a color x. Since background colors $B_k$ are fed to the foreground GMM $G^F$, if the foreground and background colors are well-separable, both $G^F(B_k)$ and $G^B(F_k)$ should be small, thus the matte confidence $f_j$ is high. In at least some embodiments, once $f_j$ is computed, the local trimap radius may be updated as:

$$d^{F/B}_{final}(q_j) = (1 - f_j)d^{F/B}(q_j) + f_j \hat{d}^{F/B}(q_j), \quad (3)$$

where $d(q_j)$ is the propagated radius computed using equation (1), and $\hat{d}(q_j)$ is the new radius computed from the matte.

Figure 9A:
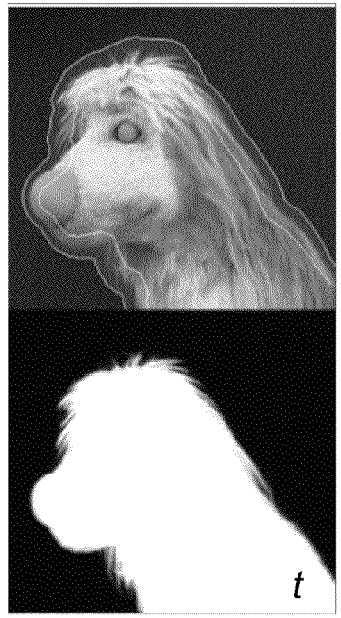
FIGS. 9A through 9D illustrate an adaptive trimap update on two examples, according to at least some embodiments.
Figure 9B:
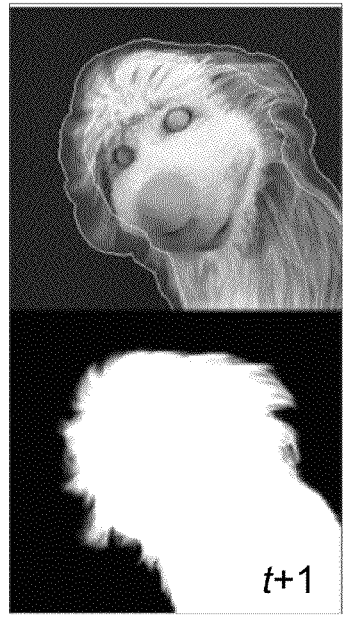
Figure 9C:
Figure 9D:

In at least some embodiments, when the local matte confidence is low (e.g., below a threshold), the trimap radius update may be frozen so that the trimap can stay stable when the matte cannot be trusted to avoid divergence. FIGS. 9A through 9D illustrate an adaptive trimap update on two examples using equation (3), according to at least some embodiments. In FIGS. 9A and 9B, the foreground and background color distributions are separable and the matte confidence is high (e.g., above the threshold), and thus the system allows the trimap to be freely updated based on the estimated mattes. In FIGS. 9C and 9D, the color distributions are mixed, and the system freezes the trimap radius update to allow stability.

Warp-based Adaptive Trimap Propagation Method

Embodiments of a warp-based adaptive trimap propagation method are described that employs pins on the binary segmentation boundary and a mesh generated for the unknown region (the initial adaptive trimap) to propagate the adaptive trimap from frame to frame.

Figure 10:
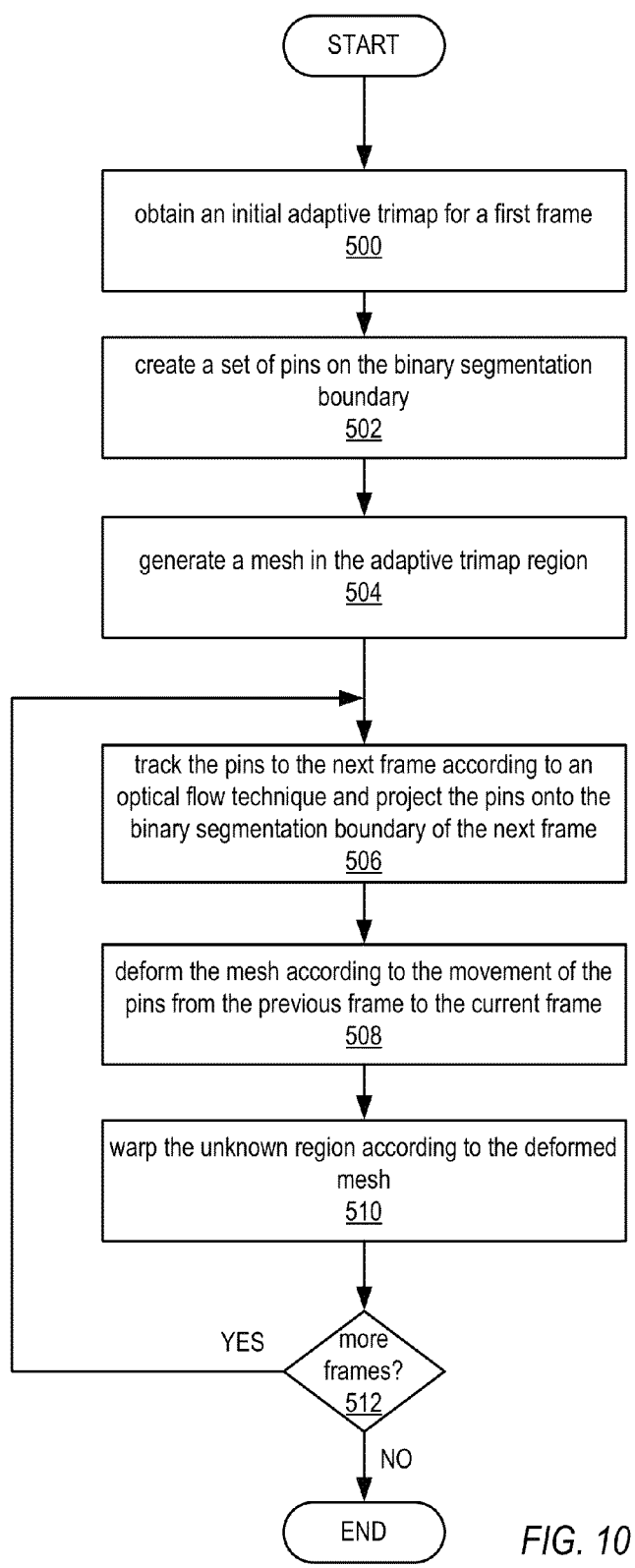
FIG. 10 is a high-level flowchart of a warp-based adaptive trimap propagation method, according to at least some embodiments.

FIG. 10 is a high-level flowchart of a warp-based adaptive trimap propagation method, according to at least some embodiments. As indicated at 500, an initial adaptive trimap (also referred to as the unknown region) for a first frame in a video sequence may be obtained. In at least some embodiments, the initial adaptive trimap may be user-specified. As indicated at 502, a set of pins is created on the binary segmentation boundary. In at least some embodiments, the pins may be evenly spaced at locations or points along the binary segmentation boundary. The binary segmentation boundary may be determined according to a binary mask for the image. As indicated at 504, a mesh structure, for example a triangle mesh, may be generated in the unknown region. The pins may be vertices in the mesh. As indicated at 506, the pins are tracked from the frame to the next frame according to an optical flow technique. In at least some embodiments, if the tracked pins do not lie on the binary segmentation boundary of the next frame, the locations may be projected onto the binary segmentation boundary. As indicated at 508, the mesh is deformed from the frame to the next frame according to the movement of the pins from the frame to the next frame. As indicated at 510, the adaptive trimap (the unknown region) is then warped according to the deformed mesh. In at least some embodiments, a warping technique is used to deform the mesh that preserves the local shape of the unknown region around the binary segmentation boundaries. In at least some embodiments, the warping technique may be a puppet warp technique or a variation thereof. Note that, in some embodiments, user input may be received to adjust the new trimap. At 512, if there are more frames, the method may return to 506 to propagate the trimap to the next frame. Otherwise, the method is done. The elements of FIG. 10 are discussed in more detail below in reference to FIGS. 11A through 11D and 12A through 12C.

Figure 11A:
FIGS. 11A through 11D illustrate initialization, including user input, for the warp-based adaptive trimap propagation technique, according to at least some embodiments.
Figure 11B:
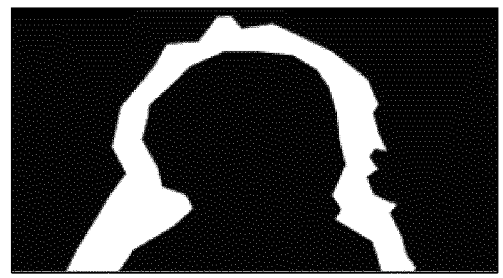
Figure 11C:
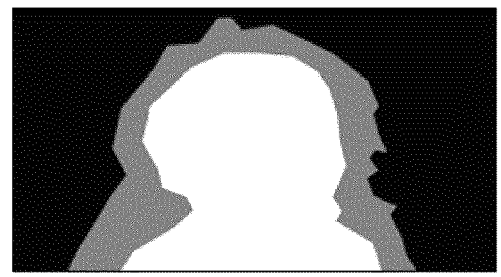
Figure 11D:
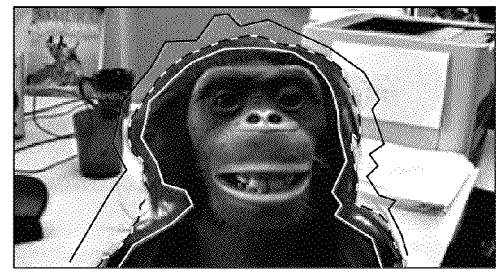

FIGS. 11A through 11D illustrate initialization, including user input, for the warp-based adaptive trimap propagation technique, according to at least some embodiments. FIG. 11A shows the binary mask for an initial video frame. In at least some embodiments, the user may create or modify an adaptive trimap by painting/erasing the unknown region, for example with a brush tool, as shown in FIG. 11B. As shown in FIG. 11C, the final trimap is the composite of the unknown region and the given binary mask. FIG. 11D shows the adaptive trimap thus generated overlaid on the image.

Figure 12A:
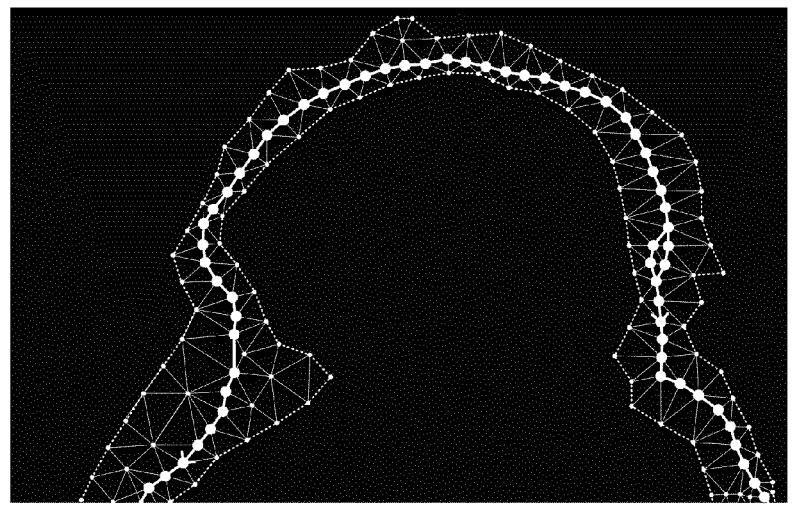
FIGS. 12A through 12C illustrate propagating an adaptive trimap according to at least some embodiments of a warp-based adaptive trimap propagation technique.
Figure 12B:
Figure 12C:
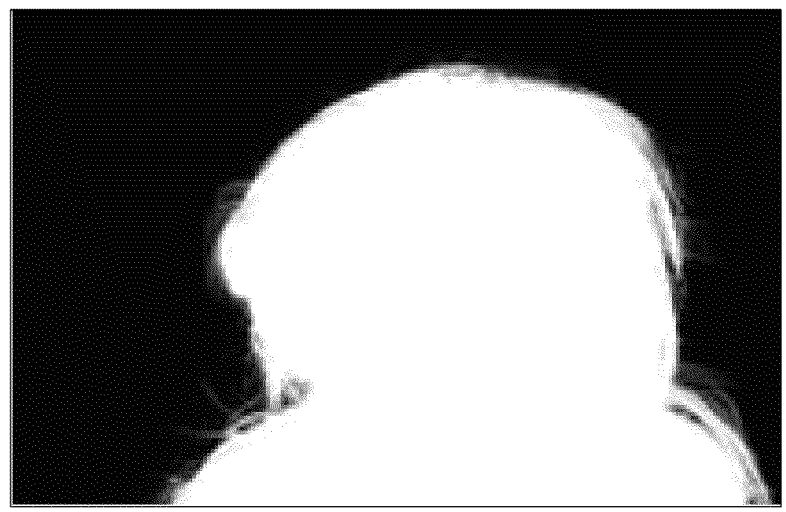

FIGS. 12A through 12C illustrate propagating an adaptive trimap according to at least some embodiments of a warp-based adaptive trimap propagation technique. To generate temporally-coherent matting results for moving objects, the local distances between the unknown region boundaries and the object boundaries need to be maintained across frames. In at least some embodiments, to achieve this, a warping technique that preserves the local shape of the unknown region around the binary segmentation boundaries may be used to deform a mesh in the unknown region. In at least some embodiments, the warping technique may be a puppet warp technique or a variation thereof.

As shown in FIG. 12A, pins (the white circles) are created along the binary segmentation boundary of a current frame, and the adaptive trimap on the current frame is triangulated to generate the mesh. An optical flow technique may then be used to push the pins onto the next frame according to an optical flow field. A warping technique may be applied to the mesh according to the movement of the pins to deform the mesh, and the adaptive trimap may be warped according to the deformed mesh. Results of warping the trimap are shown in FIG. 12B. FIG. 12C shows the alpha matte for the frame generated according to the warped trimap of FIG. 12B. The following provides more details of the processing performed in FIGS. 12A through 12C.

In at least some embodiments, to propagate a given trimap on frame t to frame t+1, the following may be performed. A set of pins, shown by the white circles in FIG. 12A, is created at points along the binary mask boundary, shown by the thicker white line in FIG. 12A. In at least some embodiments, the pins may be evenly spaced along the binary boundary. Additional sample points, shown by the white dots at the vertices of the triangles in FIG. 12A, may be added on and/or within the unknown region boundaries shown by the dotted lines. A triangle mesh may then be generated from the points, including the pin points, as shown in FIG. 12A. The positions of the pins may be tracked in frame t+1 using a locally smooth optical flow field between the two frames; the pins may then be projected onto the new binary mask boundaries. The mesh may then be deformed based on the movement of the pins using a warping technique that preserves the local shape of the unknown region around the binary segmentation boundaries. In at least some embodiments, the puppet warp algorithm or a variation thereof may be used to deform the mesh. The unknown region may then be warped using the deformed mesh, and the new trimap may be created on frame t+1. FIG. 12B shows the propagated adaptive trimap region on frame t+1, and FIG. 12C shows an alpha matte generated according to the trimap of FIG. 12B.

Figure 13:
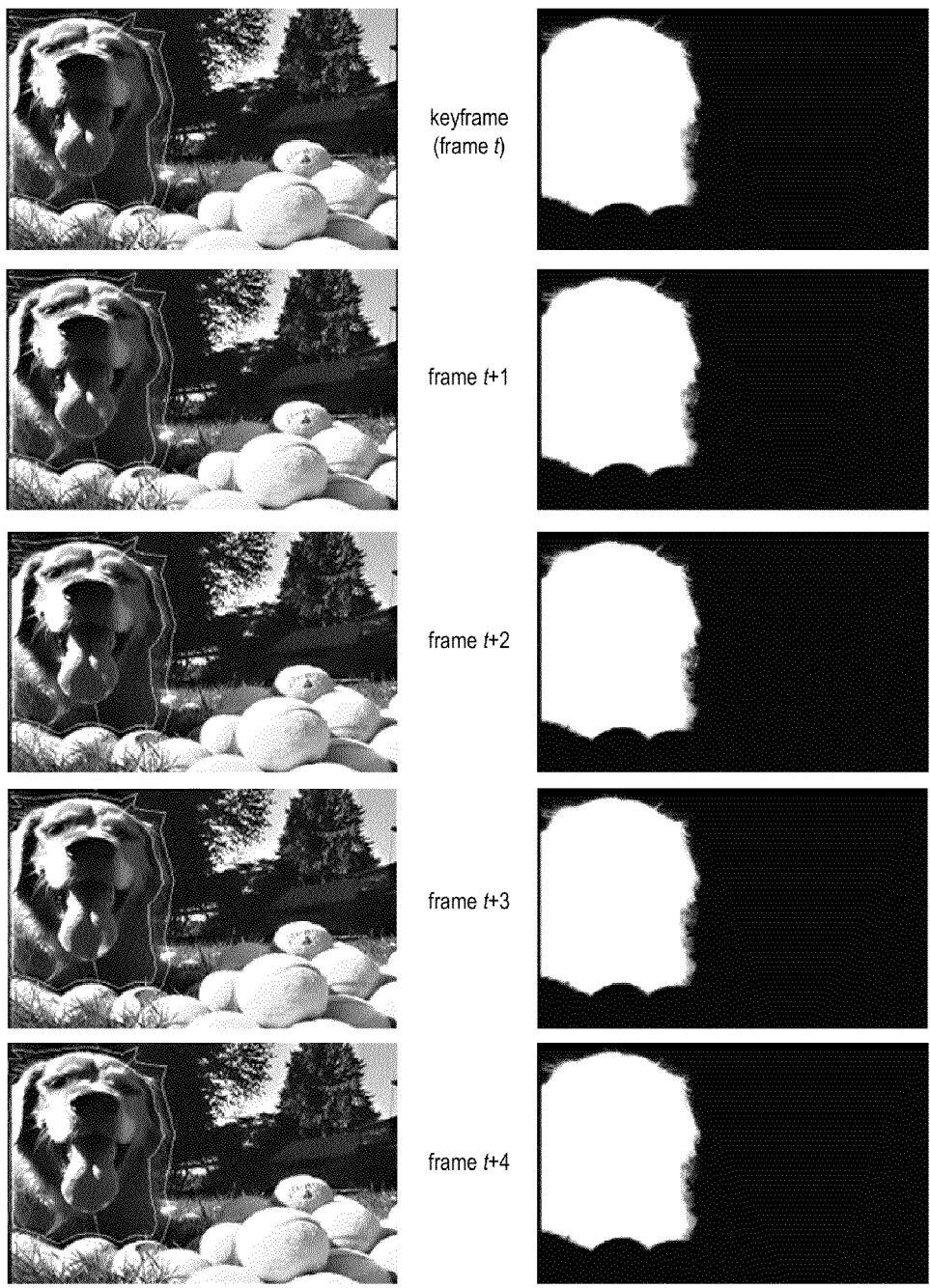
FIG. 13 shows an example of propagating an adaptive trimap to four consecutive frames from a first frame according to an embodiment of the warp-based adaptive propagation method.

FIG. 13 shows an example of propagating an adaptive trimap to four consecutive frames (frames t+1 to t+4) from a first frame t (the keyframe) according to an embodiment of the warp-based adaptive propagation method. The left column shows five frames in a sequence, with the first frame (the keyframe) at the top. The right column shows alpha mattes generated according to the respective trimap in the left column. The first trimap, shown in the top image of the left column, may be provided by the user as previously described. The warp-based adaptive propagation method preserves the local shape of the unknown region that adapts to the hairy or fuzzy boundaries, yielding improved temporal coherence when compared to conventional methods.

In at least some embodiment, a Gaussian Mixture Model (GMM) technique similar to that described above for the radius-based technique may be employed to determine local confidences according to local color mixture characteristics of foreground and background when propagating the trimap. If local confidence is high (e.g., above a threshold), the warp-based adaptive trimap propagation method may allow the bandwidth of trimap to be freely updated. If local confidence is low (e.g., below a threshold), the bandwidth may be effectively frozen between frames.

Combined Adaptive Trimap Propagation Method

Figure 14:
FIG. 14 shows an example image on which the warp-based method may be applied to some regions of the adaptive trimap, while the radius-based method may be applied to other regions of the trimap.

Embodiments of an adaptive trimap propagation method may be implemented that employs both the radius-based adaptive trimap propagation method and the warp-based adaptive trimap propagation method. The warp-based method may generally be better at preserving structures; the warping technique used may maintain the shape from frame to frame. Thus, the warp-based method may perform better than the radius-based methods on some portions of a trimap, for example relatively thick or irregular bandwidth regions. In contrast, the radius-based method may be better at propagating band-shaped portions of the trimap where the bandwidth of the trimap is relatively consistent. FIG. 14 shows an example image on which the warp-based method may be applied to the adaptive trimap between the two white lines, while the radius-based method may be applied to the other regions of the trimap.

Figure 15:
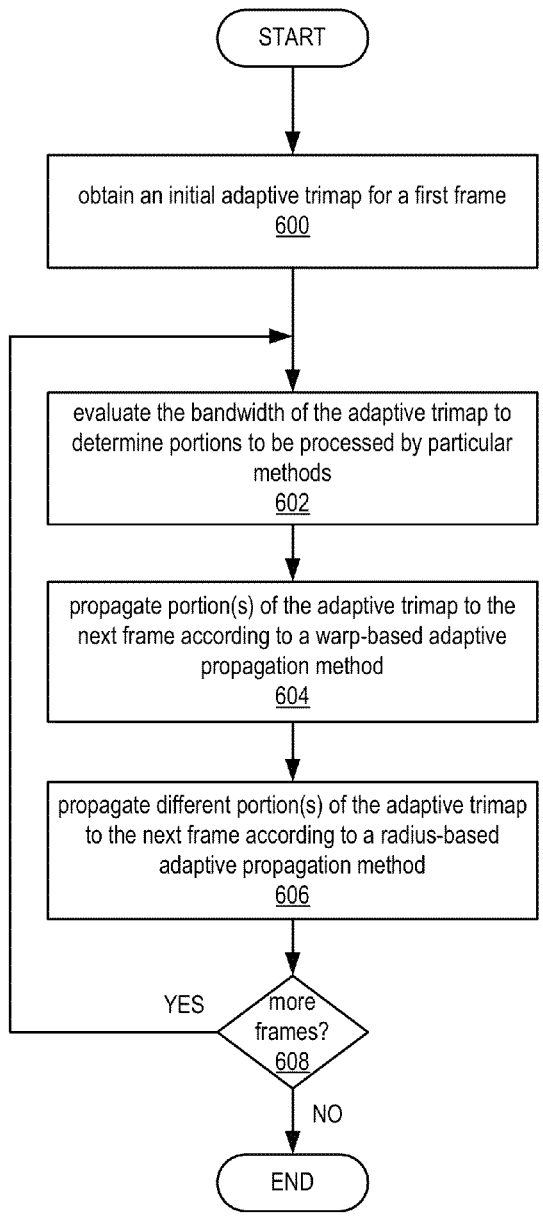
FIG. 15 is a flowchart of an adaptive trimap propagation method that combines the warp-based method and the radius-based method, according to at least some embodiments.

FIG. 15 is a flowchart of an adaptive trimap propagation method that combines the warp-based method and the radius-based method, according to at least some embodiments. As indicated at 600, an initial adaptive trimap for a first frame in a video sequence may be obtained. In at least some embodiments, the initial adaptive trimap may be user-specified. As indicated at 602, an evaluation of the bandwidth of the trimap may be performed to determine portion(s) of the trimap that are better suited to the warp-based method, and other portion(s) of the trimap that are better suited to the radius-based method. As indicated at 604, portion(s) of the adaptive trimap identified by the evaluation may be propagated to the next frame according to the warp-based adaptive propagation method, for example as shown in FIG. 10. As indicated at 606, different portion(s) of the adaptive trimap may be propagated to the next frame according to a radius-based adaptive propagation method, for example as shown in FIG. 7. Note that, in some embodiments, user input may be received to adjust the new trimap. At 608, if there are more frames, the method may return to 602 to propagate the trimap to the next frame. Otherwise, the method is done.

Temporal Matte Filter for Video Matting

Due to various contributing factors such as scene color changes and image noise, alpha mattes generated on individual frames may contain a certain degree of temporal jitter. Embodiments of a temporal matte filter are described that may reduce the jitter and improve the temporal coherence of the final alpha mattes in alpha matte sequences in video matting systems. Embodiments of the temporal matte filter may, for example, be used in a video matting system as illustrated in FIGS. 4 and 5 to reduce jitter and improve temporal coherence in alpha matte sequences generated according to one of the adaptive trimap propagation methods described herein. However, embodiments of the temporal matte filter may also be used to reduce jitter and improve temporal sequences in alpha matte sequences generated by other methods.

Level-set-based Matte Averaging

Embodiments of the temporal matte filter may be based on a level set parameterization of the grayscale alpha matte. The following first describes how to interpolate between two alpha matte images: given two alpha mattes $\alpha^1$ and $\alpha^2$, generate an in-between (averaged) matte $\alpha^*=f_I(\alpha^1,\alpha^2,\beta)$, where $\beta \in [0,1]$ is the interpolation coefficient. Directly applying pixel-wise interpolation will not work since the two alpha mattes $\alpha^1$ and $\alpha^2$ are not aligned due to object or camera movement. Embodiment of the temporal matte filter instead implement a level-set-based averaging approach.

Figure 16:
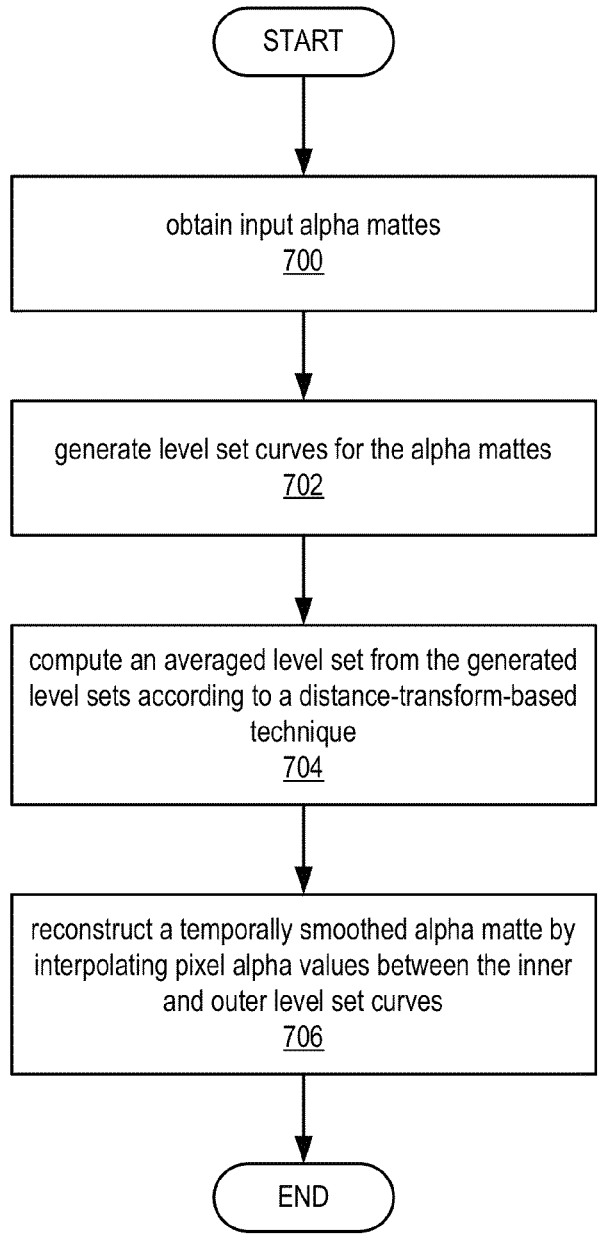
FIG. 16 is a high-level flowchart of a level-set-based matte averaging method, according to at least some embodiments.

FIG. 16 is a high-level flowchart of a level-set-based matte averaging method, according to at least some embodiments. As indicated at 700, two or more input alpha mattes are obtained. As indicated at 702, level set curves are generated for the two or more alpha mattes. As indicated at 704, an averaged level set is computed from the two or more level sets according to a distance-transform-based technique. As indicated at 706, a temporally smoothed alpha matte may then be reconstructed by interpolating pixel alpha values from two nearest level set curves in the averaged level set for each pixel between the inner and outer level set curves of the averaged level set. Each pixel outside the inner and outer level set curves may be assigned either a background value or a foreground value, depending on which side (background or foreground) of the averaged level set the pixel is on. Each of these elements are described in more detail below in reference to FIGS. 17A through 17H.

Figure 17A:
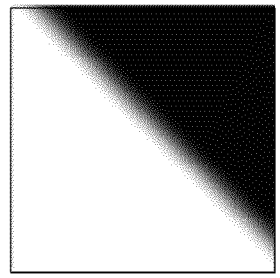
FIGS. 17A through 17H graphically illustrate elements of the level-set-based matte averaging method, according to at least some embodiments.
Figure 17B:
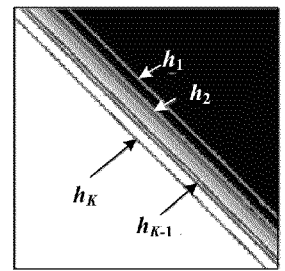
Figure 17C:
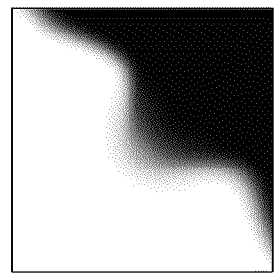
Figure 17D:
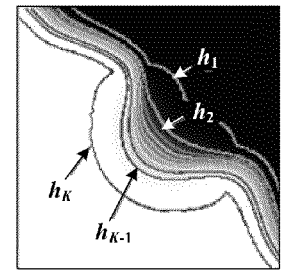
Figure 17E:
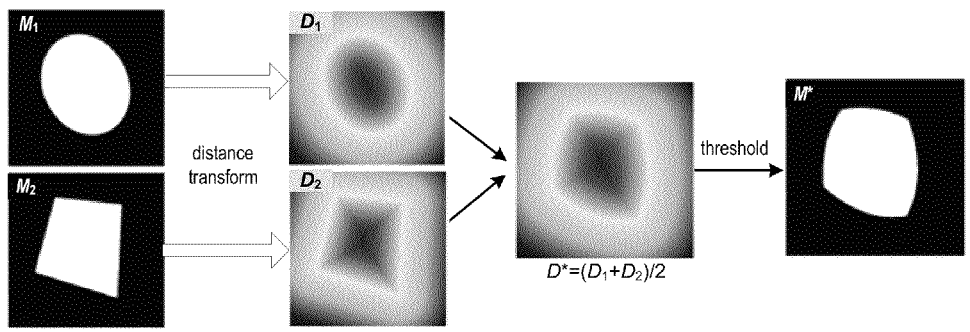
Figure 17F:
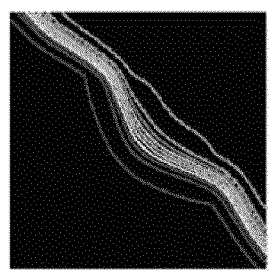
Figure 17G:
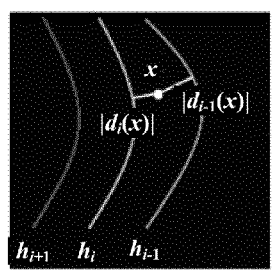
Figure 17H:
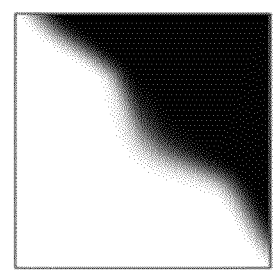

FIGS. 17A through 17H graphically illustrate elements of the level-set-based matte averaging method, according to at least some embodiments. FIGS. 17A and 17B show a first input alpha matte (17A) and its level set curves (17B). FIGS. 17C and 17D show a second input alpha matte (17C) and its level set curves (17D). FIG. 17E illustrates a distance-transform-based curve averaging method applied to two example binary masks $M_1$ and $M_2$ to generate an average mask $M^*$, according to at least some embodiments. FIG. 17F illustrates the averaged level set curves from the level set curves shown in FIGS. 17B and 17D. FIG. 17G illustrates that the alpha value of any pixel x is determined by interpolation between nearest level set curves. FIG. 17H illustrates a final temporally smoothed alpha matte generated according to the level-set-based matte averaging method. Each of these elements is further described below.

As indicated at 702 of FIG. 16, level set curves are generated for two or more input alpha mattes. As shown in FIG. 17A through 17D, given two input mattes, the mattes may be parameterized using level set curves, where each curve is defined as the boundary of the iso-level region:

$$h_i = \partial M_i, M_i = \{x | \alpha(x) > i/K\}, i=0, \ldots, (K-1)$$

Note that each curve has a signed normal pointing to the descendent direction of the alpha matte.

As indicated at 704 of FIG. 16, in at least some embodiments, an averaged level set may be computed from the two or more level sets according to a distance-transform-based technique. Given two level sets $\{h_i^1\}$ and $\{h_i^2\}$ (FIGS. 17B and 17D, respectively), embodiments may compute an averaged level set (FIG. 17F) by interpolating each pair of corresponding curves $h_i^1$ and $h_i^2$, using a distance-transform-based method as illustrated in FIG. 17E. The distance-transform-based method first applies a signed distance transform on $h_i^1$ and $h_i^2$, denoted as $D_1$ and $D_2$. The method then averages the two distance transform fields ($D_1$ and $D_2$) to create a new distance field $D^*=(D_1+D_2)/2$ (assuming $\beta=0.5$), and then thresholds the distance field to an average binary shape $M^*$ as the interpolation result. The contour of $M^*$ is the averaged curve $h_i^*$.

Generalizing the above to n level sets:

$$Avg(M_1, M_2, \ldots, M_n) = \delta\left(\frac{1}{n}\sum_{i=1}^{n} DT(M_i)\right),$$

where DT is the signed distance transform, and where:

$$\delta(x) = \begin{cases} 1, & x \geq 0 \\ 0, & x < 1 \end{cases}$$

As indicated at 706 of FIG. 16, an averaged (temporally smoothed) alpha matte may then be reconstructed by interpolating pixel alpha values between the inner and outer level set curves of the averaged level set (FIG. 17F). Once the averaged level set $\{h_i^*\}$ as shown in FIG. 17G is generated from the level sets shown in FIGS. 17B and 17D, for a pixel x on the image plane, the method may first identify the pixel's shortest distances to the nearest two level set curves $h_i^*$ and $h_{i-1}^*$ as $d_i(x)$ and $d_{i-1}(x)$. In at least some embodiments, the alpha value of x may then be interpolated as:

$$\alpha(x) = \gamma \cdot \frac{i}{K} + (1-\gamma) \cdot \frac{i-1}{K}, \tag{4}$$

$$\text{where } \gamma = \frac{d_{i-1}(x)}{d_{i-1}(x) + d_i(x)}.$$

By applying equation (4) to all pixels between the inner and outer level set curves $h_K^*$ and $h_0^*$, and assigning other pixels outside these two curves to be foreground or background (e.g., 1.0 or 0.0), the method can reconstruct an averaged matte as shown in FIG. 17H. The averaged matte maintains the same alpha profile with the two input mattes, in spite of the fact that the two input mattes have a significant shape difference.

Temporal Matte Filtering

The level-set-based matte averaging method described above may be used for temporal matte filtering. Given mattes on three adjacent frames $\alpha_{t-1}$, $\alpha_t$, and $\alpha_{t+1}$ (see FIG. 18A or FIG. 19), a temporal filter may be defined as:

$$\alpha_{t(new)} = f_I(\alpha_t, f_I(\alpha_{t-1}, \alpha_{t+1}, 0.5), 0.5), \tag{5}$$

where $f_I$ is the level-set-based matte averaging method as described above. Essentially, the temporal filter is a weighted interpolation of three mattes using the level-set-based matte averaging method. In some embodiments, the weights for the three frames are $\{0.25, 0.5, 0.25\}$. The filter could be applied iteratively over a chunk of frames to achieve a stronger temporal smoothing effect.

Figure 18A:
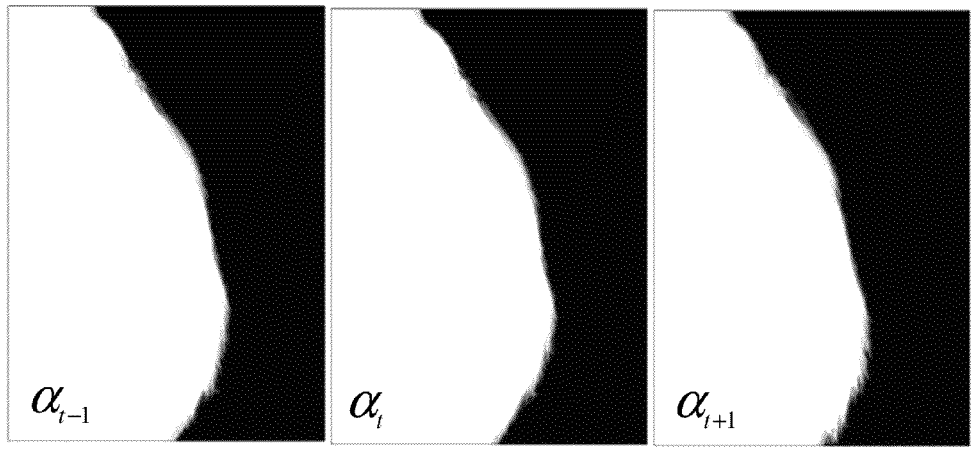
FIGS. 18A through 18D compare results of an embodiment of the temporal matte filtering method with results of some conventional temporal smoothing approaches.
Figure 18B:
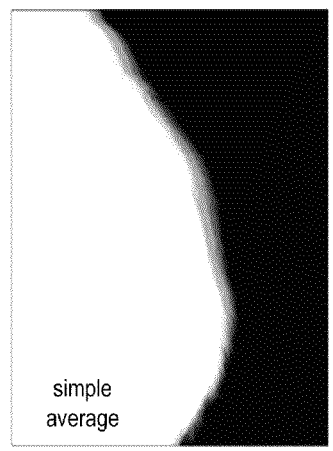
Figure 18C:
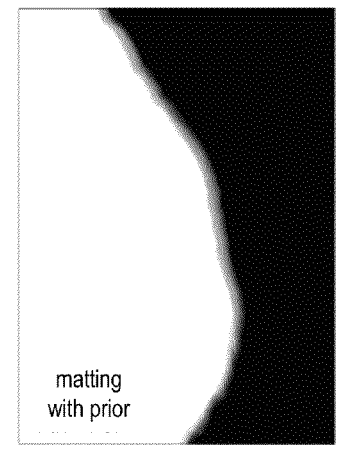
Figure 18D:
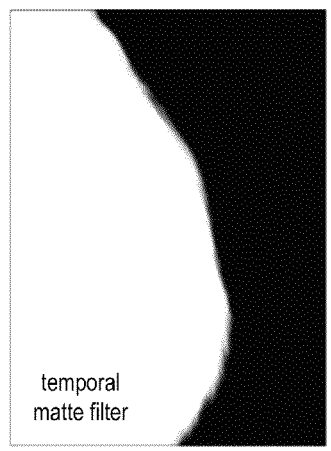

FIGS. 18A through 18D compare results of an embodiment of the temporal matte filtering method with results of some conventional temporal smoothing approaches. Given three input mattes $\alpha_{t-1}$, $\alpha_t$, and $\alpha_{t+1}$ as shown in FIG. 18A, a simple conventional solution is to apply a pixel-wise temporal Gaussian filter on the mattes (FIG. 18B). However, as shown in FIG. 18B, since the matte structures are not well-aligned, pixel-wise interpolation results in a significantly blurred foreground edge. Another conventional approach is to treat $\alpha_{t-1}$ and $\alpha_{t+1}$ as priors, and re-solve $\alpha_t$ according to a matting energy function (FIG. 18C). However, this method also produces blurry results and destroys the underlying matte structure, as can be seen in FIG. 18C. In contrast, embodiments of the temporal matte filter are able to effectively reduce the temporal jitter while maintaining the original matte structure, as shown in FIG. 18D.

The averaging between two mattes can be extended to an arbitrary number of mattes. In at least some embodiments, given N alpha mattes, the level set curves for each matte may be parameterized as described above. The weighted average of $h_i^1, h_i^2, \ldots, h_i^N$ may be computed using the distance transform fields:

$$D^* = \sum_{k=1}^{N} \beta_k D_k, \text{ s.t. } \sum_{k=1}^{N} \beta_k = 1.$$

After obtaining all the level set curves, the temporally smoothed alpha matte may be reconstructed as in the case of two mattes.

Figure 19:
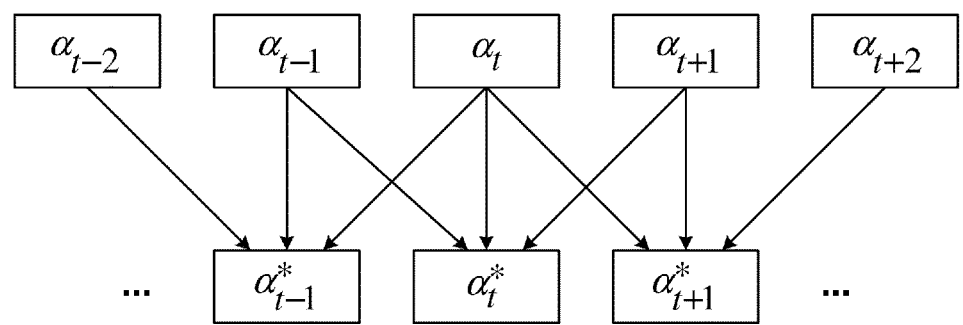
FIG. 19 graphically illustrates temporal matte filtering on a matte sequence, according to at least some embodiments.

FIG. 19 graphically illustrates temporal matte filtering on a matte sequence, according to at least some embodiments. As shown in FIG. 19, a smoothed matte (e.g., $\alpha_t^*$) may be computed by taking the average of three adjacent mattes (e.g., $\alpha_{t-1}$, $\alpha_t$, and $\alpha_{t+1}$). In at least some embodiments, to reduce the temporal high frequency, at least some embodiments may compute the average $\alpha_t^*$ of three adjacent mattes $\alpha_{t-1}$, $\alpha_t$, and $\alpha_{t+1}$ (see FIG. 19) with weights:

$$\beta_{t-1} = \frac{\omega}{3}, \beta_t = 1 - \frac{2}{3}\omega, \beta_{t+1} = \frac{\omega}{3},$$

where $\omega = [0,1]$ controls the smoothness of the average matte. In at least some embodiments, $\omega = 1$ may be used for maximal smoothing effect.

Figure 20A:
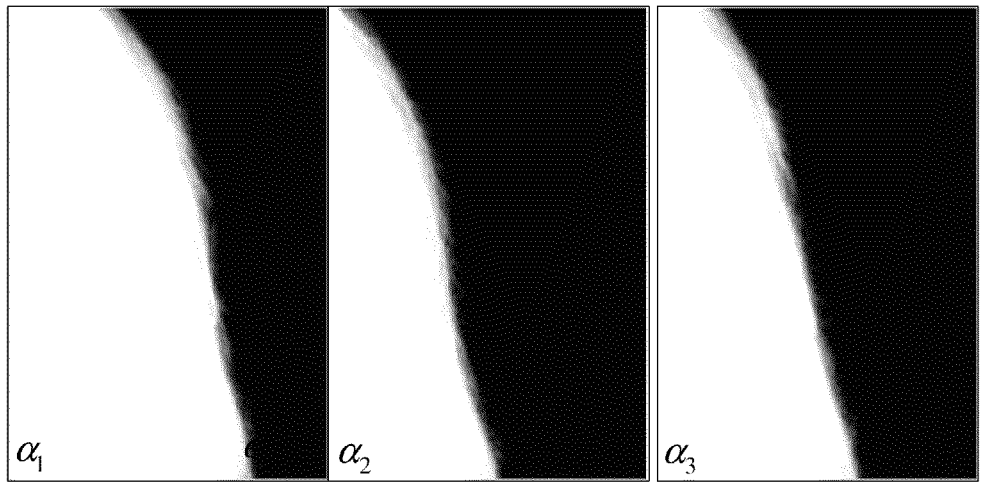
FIGS. 20A through 20E show an example in which the temporal matte filter method is applied to three alpha mattes to generate a smoothed alpha matte, according to at least some embodiments.
Figure 20B:
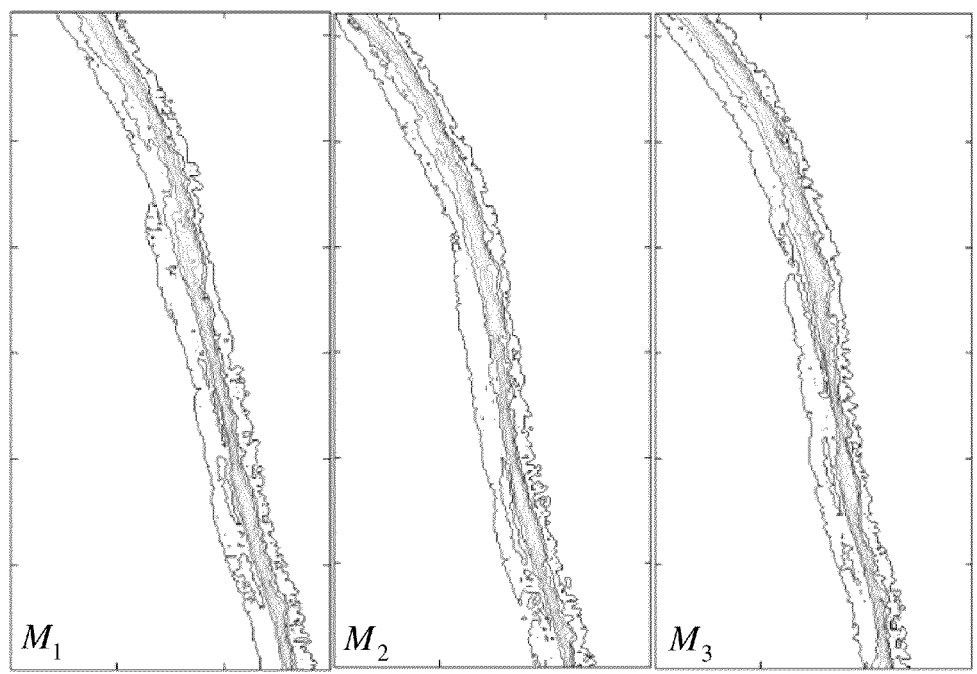
Figure 20C:
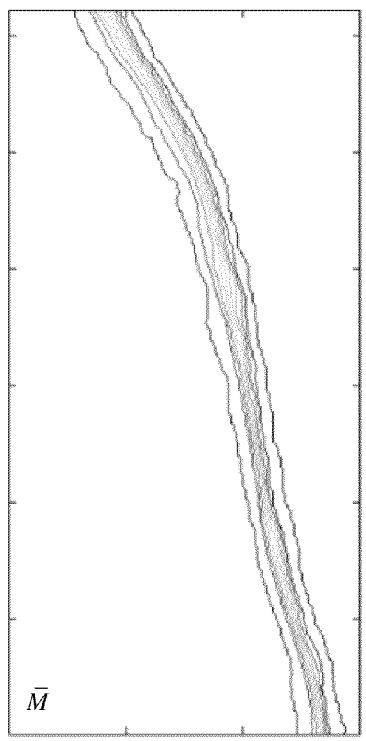
Figure 20D:
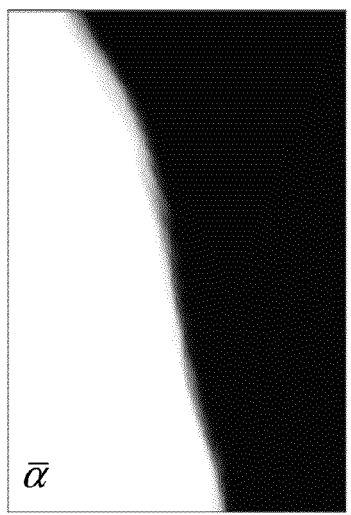
Figure 20E:
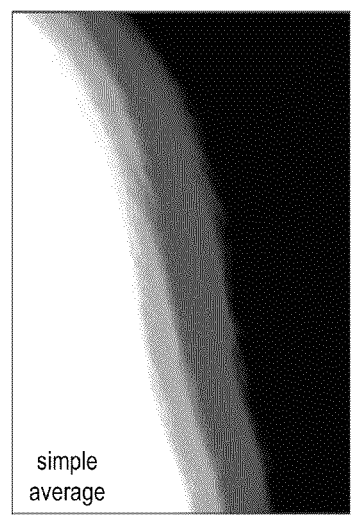

FIGS. 20A through 20E show an example in which the temporal matte filter method is applied to three alpha mattes to generate a smoothed alpha matte, according to at least some embodiments. FIG. 20A shows three input alpha mattes $\alpha_1$, $\alpha_2$, and $\alpha_3$. FIG. 20B shows level set curves $M_1$, $M_2$, and $M_3$ generated for alpha mattes $\alpha_1$, $\alpha_2$, and $\alpha_3$ of FIG. 20A, respectively. FIG. 20C shows the averaged level set $\overline{M}$ generated from the level set curves $M_1$, $M_2$, and $M_3$ of FIG. 20B. FIG. 20D shows the smoothed alpha matte $\overline{\alpha}$ generated according to the averaged level set $\overline{M}$ of FIG. 20C. FIG. 20E shows a simple average of the alpha mattes $\alpha_1$, $\alpha_2$, and $\alpha_3$ of FIG. 20A for comparison.

Figure 21:
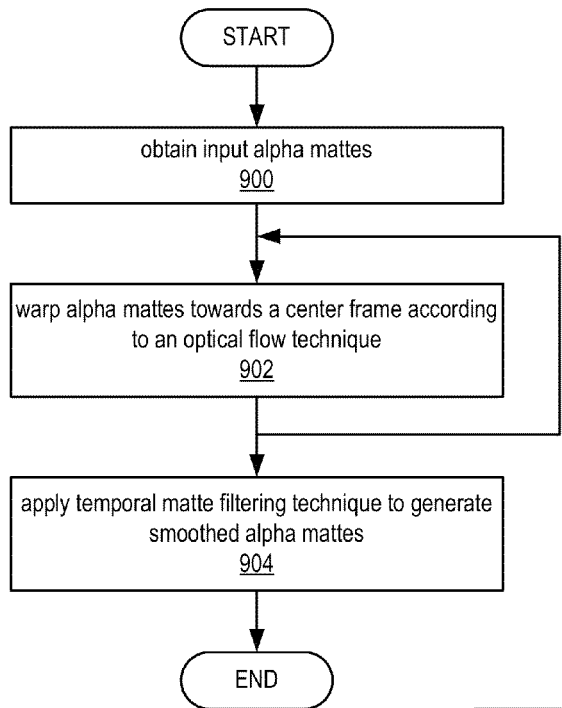
FIG. 21 is a flowchart of a method for applying the temporal matte filter to warped alpha mattes to improve the temporal smoothing effect, according to at least some embodiments.

In at least some embodiments, for higher quality results, the alpha mattes can be optionally warped towards a center frame using locally smooth optical flow fields before the averaging operation performed by the temporal matte filter, as shown in FIG. 21. The temporal matte filter may then be applied iteratively over a chunk of frames to achieve a stronger temporal smoothing effect.

FIG. 21 is a flowchart of a method for applying the temporal matte filter to warped alpha mattes to improve the temporal smoothing effect, according to at least some embodiments. As indicated at 900, a sequence of input alpha mattes may be obtained. The alpha mattes may, for example, be generated according to one of the adaptive trimap propagation methods described herein. As indicated at 902, two or more of the alpha mattes may be warped towards a center frame, for example according to an optical flow technique. A method for warping the frames that may be used in at least some embodiments is provided in FIG. 22. As indicated at 904, an embodiment of the temporal matte filtering technique may then be applied to the warped alpha mattes to generate the smoothed alpha mattes.

Figure 22:
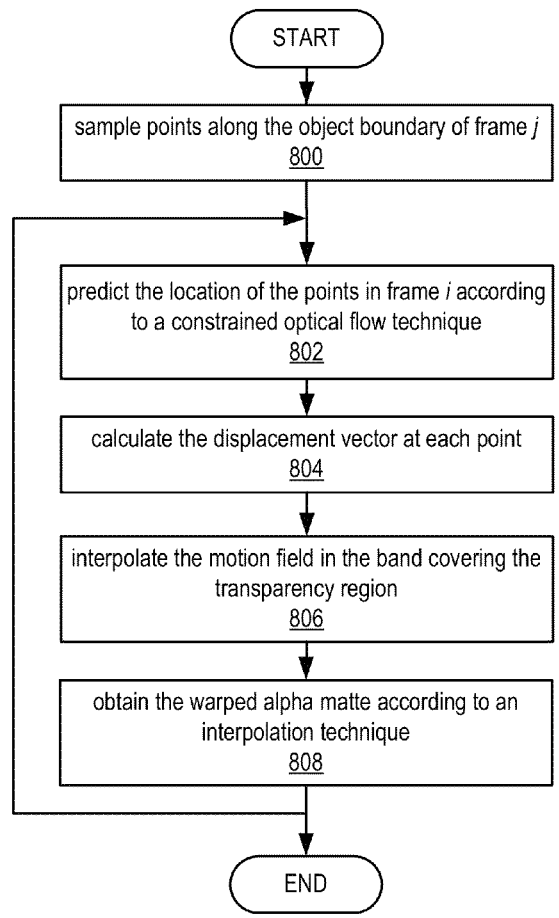
FIG. 22 is a flowchart of a method for warping the alpha mattes prior to applying the temporal matte filter, according to at least some embodiments.
Figure 23:
FIG. 23 graphically illustrates sample points along the boundary of an object.

FIG. 22 is a flowchart of a method for warping the alpha mattes prior to applying the temporal matte filter, according to at least some embodiments. As indicated at 800, sample points (denoted by $x_k$) along the object boundary (binary segmentation boundary) of frame j (the center frame) may be obtained. FIG. 23 graphically illustrates sample points (the circles) along the boundary of an object. As indicated at 802, the location of the points in frame i (one of the frames to be warped) may be predicted, for example according to a constrained optical flow technique. As indicated at 804, a displacement vector $\overline{v}(x)$ may be calculated at each point (see the arrows in FIG. 23). As indicated at 806, the motion field in the band covering the transparency region in the respective alpha matte may be interpolated, for example according to a thin-plate interpolation method. As indicated at 808, the warped alpha matte may then be obtained according to an interpolation technique. The interpolation technique may be a linear or bicubic interpolation technique. In at least some embodiments, the following may be used:

$$\alpha_i^*(x) = \alpha(x + \overline{v}(x)).$$

Elements 804 through 808 may be repeated for each frame i to be warped towards the center frame j.

Figure 24A:
FIG. 24A through 24C show examples of applying an embodiment of the temporal matte filter to a sequence of input alpha mattes.
Figure 24B:
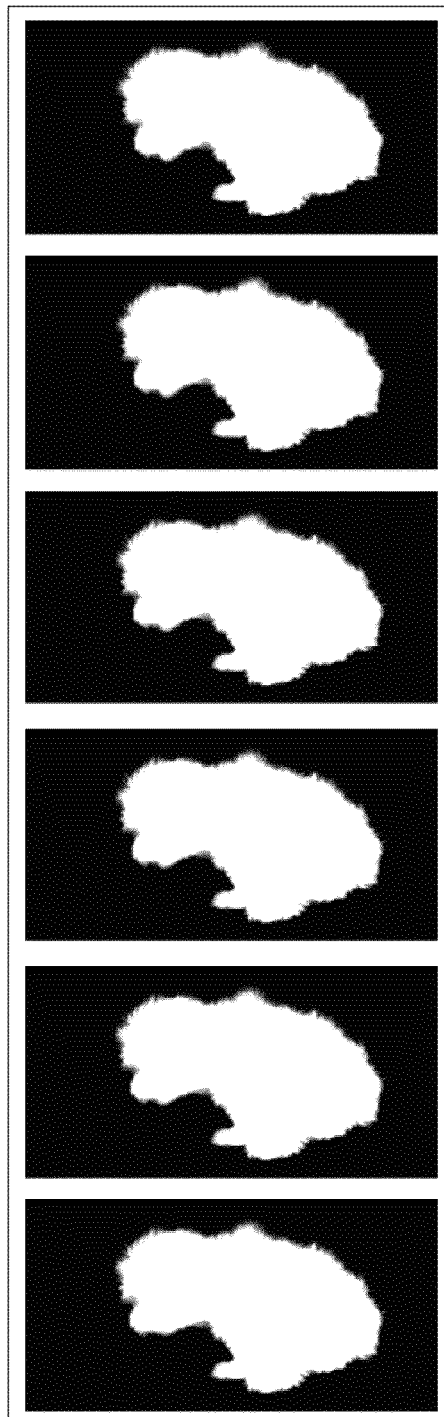
Figure 24C:
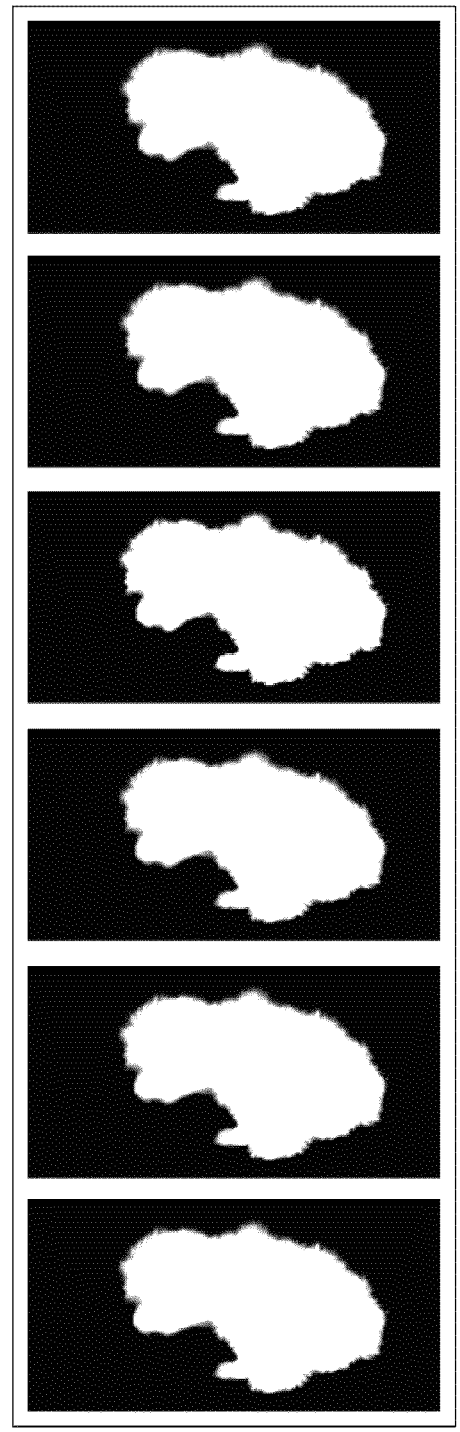

FIG. 24A through 24C show examples of applying an embodiment of the temporal matte filter to a sequence of input alpha mattes. FIG. 24A shows an original video frame from a video sequence. FIG. 24B shows a sequence of six alpha mattes generated for frames in the sequence before temporal filtering is applied, for example according to an embodiment of the adaptive trimap propagation technique described herein. FIG. 24C shows the corresponding smoothed alpha mattes generated from the input alpha mattes of FIG. 24B according to the temporal matte filter method. The temporal matte filter effectively reduces temporal chattering while maintaining the original matte structure.

Example Implementations

Some embodiments may include a means for adaptive trimap propagation for video matting, as described herein, and/or a means for temporal matte filtering as described herein. For example, a module or modules of an application may receive input including but not limited to a video sequence and binary masks for the frames in the video sequence, obtain an initial adaptive trimap for at least one frame, compute initial alpha matte(s) for the initial trimap(s), and apply an adaptive trimap method as described herein to propagate the trimap(s) to other frames in the video sequence, as described herein. In addition, a module or modules of an application may obtain alpha mattes for a sequence of video frames and apply a temporal matte filter technique to the frames to reduce temporal jitter in the alpha mattes, as described herein. The module or modules may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform an adaptive trimap propagation method and/or a temporal matte filter method, as described herein. Other embodiments of the module or modules may be at least partially implemented by hardware circuitry and/or firmware stored, for example, in a non-volatile memory.

Figure 27:
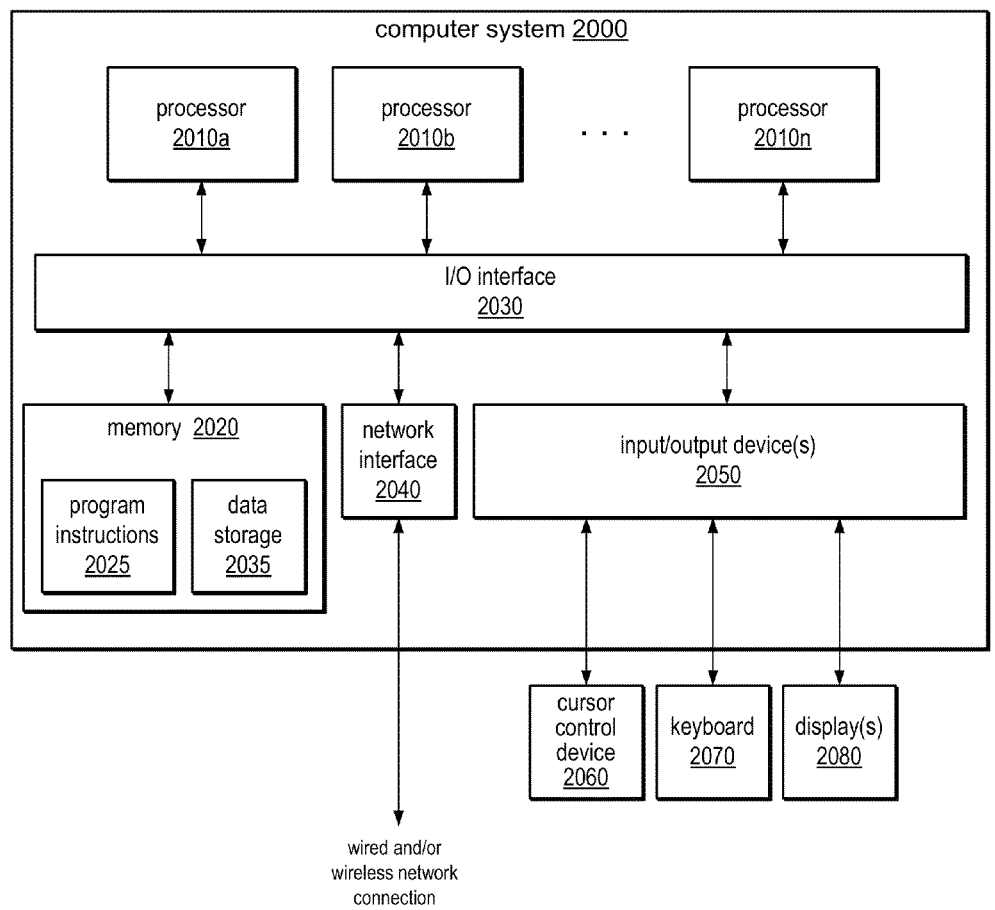
FIG. 27 illustrates an example computer system that may be used in embodiments.

FIG. 26 illustrates an example video matting module that may implement one or more of a method for adaptive trimap propagation and a method for temporal trimap filtering as illustrated in FIGS. 1 through 25. FIG. 27 illustrates an example computer system on which embodiments of module(s) 1900 may be implemented. Video matting module 1900 may include at least an adaptive trimap propagation module 1904 and a temporal matte filtering module 1908. Video matting module 1900 may also include an alpha matte generation 1906 component or module, and may implement a user interface 1902. Video matting module 1900 receives as input a video image sequence 1910 including multiple frames. Video matting module 1900 may also receive as input binary masks for an object or objects in at least some of the frames. Alternatively, video matting module 1900 may, automatically and/or via user input 1912, generate the binary masks. Adaptive trimap propagation module 1904 may receive or generate one or more initial adaptive trimaps for the video sequence 1910. In at least some embodiments, the initial adaptive trimap(s) may be generated according to user input 1912. Adaptive trimap propagation module 1904 may implement one or more of the adaptive trimap propagation methods as described herein, for example as shown in FIGS. 6, 7, 10, and/or 15. The adaptive trimap propagation method(s) may be applied to propagate the initial adaptive trimap(s) to other frames in the video sequence as described herein. Adaptive trimap propagation module 1904 may receive user input 1912 to modify one or more of the adaptive trimaps, as shown at elements 306 and 308 of FIG. 6. Adaptive trimap propagation module 1904 may output the propagated trimaps. Initial alpha mattes are then generated according to the propagated trimaps by an alpha matte generation 1906 component or module.

Temporal matte filter module 1908 may implement one or more of the temporal matte filtering methods as described herein, for example as shown in FIG. 16. The temporal matte filtering method(s) may be applied to the initial alpha mattes to improve the temporal coherence of the final alpha mattes while maintaining the matte structures on individual frames, as described herein. In at least some embodiments, at least some of the initial alpha mattes may be warped towards center frame(s) prior to performing the temporal matte filtering technique, for example as shown in FIGS. 21 and 22. Video matting module 1900 generates as output alpha mattes 1950 for the video sequence 1910. Alpha mattes 1950 may, for example, be displayed on a display 1960 device, stored to a storage medium 1970, such as system memory, a disk drive, DVD, CD, etc., and/or passed on to one or more other modules 1980 for additional processing.

While FIG. 26 shows a video matting module 1900 that implements both an adaptive trimap propagation module 1904 and a temporal matte filtering module 1908 that implement adaptive trimap propagation method(s) and temporal matte filtering method(s) as described herein, respectively, note that either adaptive trimap propagation module 1904 or temporal matte filtering module 1908 may be implemented in a video matting module 1900 or other module or application without the other module. For example, a video matting module 1900 may implement the adaptive trimap propagation module 1904 but not the temporal matte filtering module 1908, or vice versa.

Embodiments of the video matting module 1900 or embodiments of the adaptive trimap propagation module 1904 and the temporal matte filtering module 1908 may be implemented as module(s) within an application, as plug-in(s) for applications, as library functions, and/or as stand-alone applications. Embodiments of the module(s) or one or more of the methods and algorithms as described herein may be implemented in any video processing application. A non-limiting example application in which embodiments of the modules or methods as described herein may be implemented is Adobe® After Effects®. Adobe and Adobe After Effects are either registered trademarks or trademarks of Adobe Systems Incorporated in the United States and/or other countries.

Example System

Embodiments of the video matting methods as illustrated in FIGS. 1 through 22B may be executed on one or more computer systems, which may interact with various other devices. One such computer system is illustrated by FIG. 24. In different embodiments, computer system 2000 may be any of various types of devices, including, but not limited to, a personal computer system, desktop computer, laptop, notebook, or netbook computer, pad or tablet device, mainframe computer system, handheld computer, workstation, network computer, a camera, a video camera, a set top box, a mobile device, a wireless phone, a smart phone, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more touch- or multitouch-enabled devices as input/output devices, for example a touch-enabled display and/or pad. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the methods for video matting methods as illustrated in FIGS. 1 through 26 are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 27, memory 2020 may include program instructions 2025, configured to implement embodiments of the video matting methods as illustrated in FIGS. 1 through 26, and data storage 2035, comprising various data accessible by program instructions 2025. In one embodiment, program instructions 2025 may include software elements of embodiments of the video matting methods as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of the video matting methods as described herein. In particular, the computer system and devices may include any combination of hardware or software that can perform the indicated functions, including a computer, personal computer system, desktop computer, laptop, notebook, or netbook computer, pad or tablet device, mainframe computer system, handheld computer, workstation, network computer, a camera, a set top box, a mobile device, network device, internet appliance, PDA, wireless phones, smart phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
applying, by one or more computing devices, temporal filtering to an alpha matte sequence for an image sequence comprising a plurality of frames to remove or reduce temporal jitter in the alpha matte sequence, wherein said applying temporal filtering comprises:
computing level sets for each of two or more sequential initial alpha mattes in the alpha matte sequence, wherein each level set includes two or more contour lines of the respective initial alpha matte, wherein each contour line corresponds to a level in the level set;
computing an average contour line at each level from the contour lines of the level sets at the respective level according to a weighted distance-transform-based technique to generate an averaged level set for the sequence of two or more initial alpha mattes, the weighted distance-transform-based technique comprising a weighted interpolation of the level sets for each of two or more sequential initial alpha mattes; and
generating a temporally smoothed alpha matte from the two or more sequential initial alpha mattes according to the averaged level set.

2. The method as recited in claim 1, wherein said computing an average contour line at each level from the contour lines of the level sets at the respective level according to the weighted distance-transform-based technique comprises:
for each level of each level set, computing a signed distance transform of the respective level;
for each level:
computing an average of the signed distance transforms at the level to generate a distance field for the level;
averaging the two or more distance transform fields to generate a new distance field;
thresholding the new distance field to generate an average binary shape for the level; and
taking the boundary of the average binary shape as the average contour line for the level.

3. The method as recited in claim 1, wherein said generating a temporally smoothed alpha matte from the two or more sequential initial alpha mattes according to the averaged level set comprises, for each pixel location between an inner and outer contour line of the averaged level set, generating a weighted interpolated alpha value for the temporally smoothed alpha matte at the pixel location according to the average contour lines in the averaged level set.

4. The method as recited in claim 3, wherein said generating an interpolated alpha value for the temporally smoothed alpha matte at the pixel location according to the average contour lines in the averaged level set comprises determining points at shortest distances from the pixel location on two nearest contour lines in the averaged level set and interpolating alpha values from the determined points.

5. The method as recited in claim 3, further comprising assigning a background or a foreground alpha value to each pixel location of the temporally smoothed alpha matte that is outside the inner and outer contour lines of the averaged level set.

6. The method as recited in claim 1, further comprising warping at least one of the two or more sequential initial alpha mattes towards a frame corresponding to a different one of the two or more sequential initial alpha mattes prior to said computing level sets for each of two or more sequential initial alpha mattes.

7. The method as recited in claim 6, wherein said warping an initial alpha matte towards a frame corresponding to a different one of the two or more initial sequential alpha mattes comprises:
determining a motion field in a band covering a transparency region in the respective alpha mask according to an optical flow technique; and
generating a warped alpha matte according to the motion field.

8. The method as recited in claim 1, further comprising applying said temporal filtering to each of two or more sets of two or more sequential initial alpha mattes in the alpha matte sequence to generate a temporally smoothed alpha matte for two or more sequential frames in the image sequence.

9. A system, comprising:
one or more processors; and
a memory comprising program instructions, wherein the program instructions are executable by at least one of the one or more processors to apply temporal filtering to an alpha matte sequence for an image sequence comprising a plurality of frames to remove or reduce temporal jitter in the alpha matte sequence, wherein, to apply temporal filtering, the program instructions are executable by the at least one processor to:
compute level sets for each of two or more sequential initial alpha mattes in the alpha matte sequence, wherein each level set includes two or more contour lines of the respective initial alpha matte, wherein each contour line corresponds to a level in the level set;
compute an average contour line at each level from the contour lines of the level sets at the respective level according to a weighted distance-transform-based technique to generate an averaged level set for the sequence of two or more initial alpha mattes, the weighted distance-transform-based technique comprising a weighted interpolation of the level sets for each of two or more sequential initial alpha mattes; and
generate a temporally smoothed alpha matte from the two or more sequential initial alpha mattes according to the averaged level set.

10. The system as recited in claim 9, wherein, to compute an average contour line at each level from the contour lines of the level sets at the respective level according to the weighted distance-transform-based technique, the program instructions are executable by the at least one processor to:
for each level of each level set, compute a signed distance transform of the respective level;
for each level:
compute an average of the signed distance transforms at the level to generate a distance field for the level;
averaging the two or more distance transform fields to generate a new distance field;
threshold the new distance field to generate an average binary shape for the level; and
take the boundary of the average binary shape as the average contour line for the level.

11. The system as recited in claim 9, wherein, to generate a temporally smoothed alpha matte from the two or more sequential initial alpha mattes according to the averaged level set, the program instructions are executable by the at least one processor to, for each pixel location between an inner and outer contour line of the averaged level set, generate a weighted interpolated alpha value for the temporally smoothed alpha matte at the pixel location according to the average contour lines in the averaged level set.

12. The system as recited in claim 11, wherein, to generate an interpolated alpha value for the temporally smoothed alpha matte at the pixel location according to the average contour lines in the averaged level set, the program instructions are executable by the at least one processor to determine points at shortest distances from the pixel location on two nearest contour lines in the averaged level set and interpolate alpha values from the determined points.

13. The system as recited in claim 9, wherein the program instructions are further executable by the at least one processor to warp at least one of the two or more sequential initial alpha mattes towards a frame corresponding to a different one of the two or more sequential initial alpha mattes prior to said computing level sets for each of two or more sequential initial alpha mattes.

14. The system as recited in claim 13, wherein, to warp an initial alpha matte towards a frame corresponding to a different one of the two or more sequential initial alpha mattes, the program instructions are executable by the at least one processor to:
determine a motion field in a band covering a transparency region in the respective alpha mask according to an optical flow technique; and
generate a warped alpha matte according to the motion field.

15. The system as recited in claim 9, wherein the program instructions are further executable by the at least one processor to apply said temporal filtering to each of two or more sets of two or more sequential initial alpha mattes in the alpha matte sequence to generate a temporally smoothed alpha matte for two or more sequential frames in the image sequence.

16. A non-transitory computer-readable storage medium storing program instructions, wherein the program instructions are computer-executable to implement:
applying, by one or more computing devices, temporal filtering to an alpha matte sequence for an image sequence comprising a plurality of frames to remove or reduce temporal jitter in the alpha matte sequence, wherein said applying temporal filtering comprises:
computing level sets for each of two or more sequential initial alpha mattes in the alpha matte sequence, wherein each level set includes two or more contour lines of the respective initial alpha matte, wherein each contour line corresponds to a level in the level set;
computing an average contour line at each level from the contour lines of the level sets at the respective level according to a weighted distance-transform-based technique to generate an averaged level set for each of the two or more sequential initial alpha mattes, the weighted distance-transform-based technique comprising a weighted interpolation of the level sets for each of two or more sequential initial alpha mattes; and
generating a temporally smoothed alpha matte from the two or more sequential initial alpha mattes according to the averaged level set.

17. The non-transitory computer-readable storage medium as recited in claim 16, wherein, in said computing an average contour line at each level from the contour lines of the level sets at the respective level according to the weighted distance-transform-based technique, the program instructions are computer-executable to implement:
for each level of each level set, computing a signed distance transform of the respective level;
for each level:
computing an average of the signed distance transforms at the level to generate a distance field for the level;
averaging the two or more distance transform fields to generate a new distance field;
thresholding the new distance field to generate an average binary shape for the level; and
taking the boundary of the average binary shape as the average contour line for the level.

18. The non-transitory computer-readable storage medium as recited in claim 16, wherein, in said generating a temporally smoothed alpha matte from the two or more sequential initial alpha mattes according to the averaged level set, the program instructions are computer-executable to implement, for each pixel location between an inner and outer contour line of the averaged level set, generating a weighted interpolated alpha value for the temporally smoothed alpha matte at the pixel location according to the average contour lines in the averaged level set.

19. The non-transitory computer-readable storage medium as recited in claim 16, wherein the program instructions are further computer-executable to implement warping at least one of the two or more initial alpha mattes towards a frame corresponding to a different one of the two or more sequential initial alpha mattes according to an optical flow technique prior to said computing level sets for each of two or more sequential initial alpha mattes.

20. The non-transitory computer-readable storage medium as recited in claim 16, wherein the program instructions are further computer-executable to implement applying said temporal filtering to each of two or more sets of two or more sequential initial alpha mattes in the alpha matte sequence to generate a temporally smoothed alpha matte for two or more sequential frames in the image sequence.

* * * * *